US012739001B2

(12) United States Patent
Göransson et al.

(10) Patent No.: US 12,739,001 B2
(45) Date of Patent: Sep. 15, 2026

(54) TAPERED CODEBOOK FOR TIME-DOMAIN BEAMFORMING

(71) Applicant: Telefonaktiebolaget LM Ericsson (publ), Stockholm (SE)

(72) Inventors: Bo Göransson, Sollentuna (SE); Sashi Kant, Åkersberga (SE); Rohit Chandra, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 286 days.

(21) Appl. No.: 18/719,896

(22) PCT Filed: Jan. 18, 2022

(86) PCT No.: PCT/IB2021/062496

§ 371 (c)(1),
(2) Date: Jun. 14, 2024

(87) PCT Pub. No.: WO2023/139397

PCT Pub. Date: Jul. 27, 2023

(65) Prior Publication Data

US 2025/0055520 A1 Feb. 13, 2025

(51) Int. Cl.
*H04B 7/06* (2006.01)
*H04B 7/0456* (2017.01)

(52) U.S. Cl.
CPC ......... *H04B 7/0617* (2013.01); *H04B 7/0456* (2013.01)

(58) Field of Classification Search
CPC ... H04B 7/0617; H04B 7/0456; H04B 7/0452
See application file for complete search history.

(56) References Cited

U.S. PATENT DOCUMENTS

| | | | | |
|---|---|---|---|---|
| 6,340,949 | B1 * | 1/2002 | Lane | H01Q 3/26 342/372 |
| 2017/0310376 | A1 * | 10/2017 | Järmyr | H04B 7/043 |
| 2022/0263240 | A1 * | 8/2022 | Leather | H01Q 15/0053 |

FOREIGN PATENT DOCUMENTS

| | | | | |
|---|---|---|---|---|
| WO | 2016141954 A1 | 9/2016 | | |
| WO | WO-2020209768 A1 * | 10/2020 | | H04W 24/02 |
| WO | 2023126668 A1 | 7/2023 | | |

OTHER PUBLICATIONS

Girnyk, Maksym A., "Efficient Cell-Specific Beamforming for Large Antenna Arrays", ARXIV.org, Cornell University Library, Oct. 11, 2021, pp. 1-14.

(Continued)

*Primary Examiner* — Habte Mered
(74) *Attorney, Agent, or Firm* — Murphy, Bilak & Homiller, PLLC

(57) ABSTRACT

Embodiments include methods for beamforming using an antenna array. Such methods include, for each pair of beamforming vectors (bk,bl) of a codebook comprising a plurality of beamforming vectors corresponding to orientations (1 . . . N), determining at least one corresponding pair of tapering vectors (tk,tl) based on minimizing at least one function f(δ,ϵ), such that when tapered beamforming vectors (tk-bk, tl-bl) are applied to the antenna array for transmitting concurrent beams of orientations (k,l), k≠l, radiated power in orientations (k,l) are at least (1−ϵ) of peak radiated powers in orientations (k,l) of beams formed by (bk,bl); and the beams of orientations (k,l) have sidelobes that are lower than δ in respective orientations (l,k). Such methods also include transmitting data concurrently in orientations (i,j), i≠j, based on weighting the antenna array by tapered beamforming vectors (ti-bi, tj-bj) corresponding to orientations (i,j). Embodiments also include nodes configured to perform such methods.

23 Claims, 13 Drawing Sheets

(56) References Cited

OTHER PUBLICATIONS

Harris, Fredric J., et al., "On the Use of Windows for Harmonic Analysis With the Discrete Fourier Transform", Proceedings of the IEEE, vol. 66, Jan. 1978, pp. 51-83.
Osseiran, Afif, "The Winner II Air Interface: Refined Spatial-Temporal Processing Solutions", IST-4-027756 Winner II, D3.4.1 v1.0, Information Society Technologies, Nov. 30, 2006, pp. 1-148.

* cited by examiner

Bartlett window 32 element DFT Codebook
Power (dB)
15
10
5
0
-5
-10
-15
-20
-25
-30
-35
-40
-80
-60
-40
-20
0
20
40
60
80
deg
Peak power loss 3-4dB
SL
-19dB Hamming window 32 element DFT Codebook
Power (dB)
15
10
5
0
-5
-10
-15
-20
-25
-30
-35
-40
-80
-60
-40
-20
0
20
40
60
80
deg
Peak power loss 3-4dB
SL
-26dB

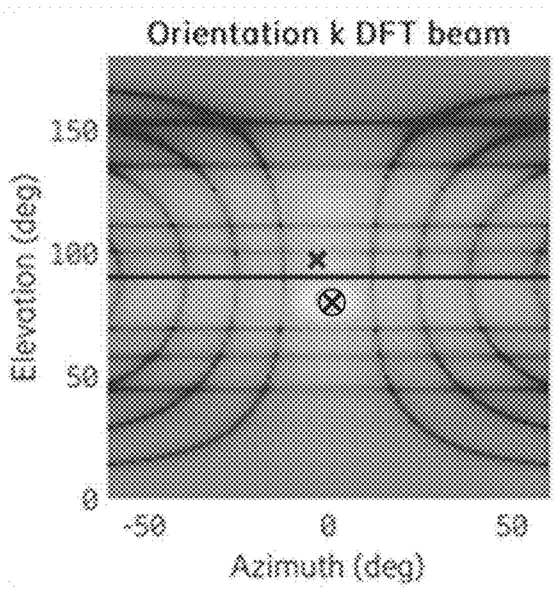
FIG. 10A
Orientation l DFT beam
Elevation (deg)
150
100
50
0
-50
0
50
Azimuth (deg)
FIG. 10B
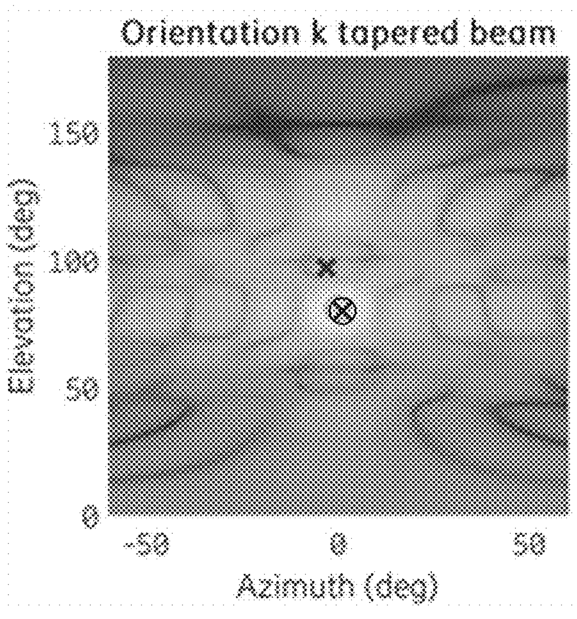
FIG. 10C
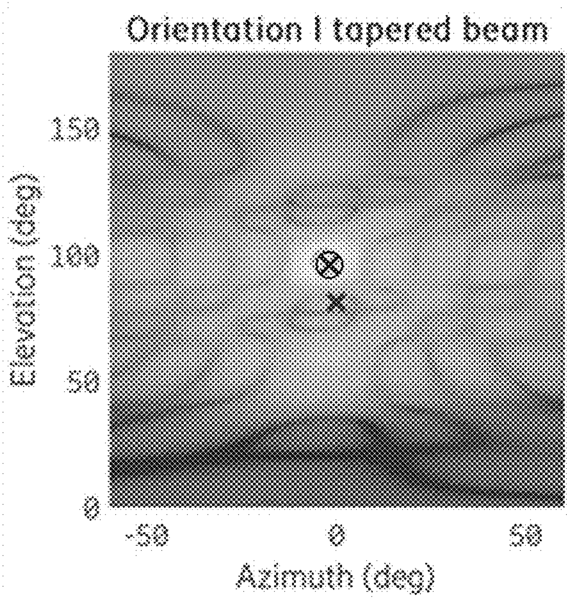
FIG. 10D AMF 1230a
UPF 1240a
PCF 1250a
NEF 1260a AMF 1230b
UPF 1240b
PCF 1250b
NEF 1260b

5GC
1298

NG
NG
NG
NG
NG
NG
NG
NG

NG-RAN
1299 gNB 1210a,
cell 1211a

Xn
Xn
Xn
Xn gNB 1210b,
cell 1211b ng-eNB 1220a,
cell 1221a ng-eNB 1220b,
cell 1221b

1300
1310 Processor(s)
1321
1320 Program memory
1330 Data memory
Bus 1370
1340 Radio Transceiver
1320 User Interface
1330 Control Interface

FIG. 13

1400
1410 Processor(s)
1421
1420 Program memory
1430 Data memory
Bus 1470
1440 Radio Network Interface
1450 Core Network Interface
1460 OA&M Interface

FIG. 14

UE 1510
1520
Radio Access Network 1530
Core Network 1540
Internet 1550
Host Computer 1560

FIG. 15

TAPERED CODEBOOK FOR TIME-DOMAIN BEAMFORMING

TECHNICAL FIELD

The present disclosure relates generally to wireless communication networks, and more specifically to techniques for improving transmit beamforming in a wireless network.

BACKGROUND

Long-Term Evolution (LTE) is an umbrella term for so-called fourth-generation (4G) radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases.

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases. NR was initially specified in 3GPP Release 15 (Rel-15) and continues to evolve through subsequent releases, such as Rel-16 and Rel-17.

5G/NR technology shares many similarities with LTE. For example, NR uses CP-OFDM (Cyclic Prefix Orthogonal Frequency Division Multiplexing) in the downlink (DL) from network to user equipment (UE), and both CP-OFDM and DFT-spread OFDM (DFT-S-OFDM) in the uplink (UL) from UE to network. As another example, NR DL and UL time-domain physical resources are organized into equal-sized 1-ms subframes. A subframe is further divided into multiple slots of equal duration, with each slot including multiple OFDM-based symbols. However, time-frequency resources can be configured much more flexibly for an NR cell than for an LTE cell. For example, rather than a fixed 15-kHz OFDM sub-carrier spacing (SCS) as in LTE, NR SCS can range from 15 to 240 kHz, with even greater SCS considered for future NR releases.

In addition to providing coverage via cells as in LTE, NR networks also provide coverage via "beams." In general, a downlink (DL, i.e., network to UE) "beam" is a coverage area of a network-transmitted reference signal (RS) that may be measured or monitored by a UE. In NR, for example, RS can include any of the following: synchronization signal/Physical Broadcast Channel (PBCH) block (SSB), channel state information RS (CSI-RS), tracking reference signals (or any other sync signal), positioning RS (PRS), demodulation RS (DMRS), phase-tracking reference signals (PTRS), etc. In general, SSB is available to all UEs regardless of the state of their connection with the network, while other RS (e.g., CSI-RS, DM-RS, PTRS) are associated with specific UEs that have a network connection.

5G/NR networks are expected to operate at higher frequencies such as 25-60 GHz, which are typically referred to as "millimeter wave" or "mmW" for short. Such systems are also expected to utilize a variety of multi-antenna technology (e.g., antenna arrays) at the transmitter, the receiver, or both. In general, multi-antenna technology can include a plurality of antennas in combination with advanced signal processing techniques (e.g., beamforming). Multi-antenna technology can be used to improve various aspects of a communication system, including system capacity (e.g., more users per unit bandwidth per unit area), coverage (e.g., larger area for given bandwidth and number of users), and increased per-user data rate (e.g., in a given bandwidth and area).

Availability of multiple antennas at the transmitter and/or the receiver can be utilized in different ways to achieve different goals. For example, multiple antennas at the transmitter and/or the receiver can be used to provide additional diversity against radio channel fading. To achieve such diversity, the channels experienced by the different antennas should have low mutual correlation, e.g., a sufficiently large antenna spacing ("spatial diversity") and/or different polarization directions ("polarization diversity").

As another example, multiple antennas at the transmitter and/or the receiver can be used to shape or "form" the overall antenna beam (e.g., transmit and/or receive beam, respectively) in a certain way, with the general goal being to improve the received signal-to-interference-plus-noise ratio (SINR) and, ultimately, system capacity and/or coverage. This can be done, for example, by maximizing the overall antenna gain in the direction of the target receiver or transmitter or by suppressing specific dominant interfering signals. More specifically, the transmitter and/or receiver can determine an appropriate weight for each antenna element in an antenna array so as to produce one or more beams, with each beam covering a particular range of azimuth and elevation relative to the antenna array.

In relatively good channel conditions, the capacity of the channel becomes saturated such that further improving the SINR provides limited capacity improvements. In such cases, using multiple antennas at both the transmitter and the receiver can be used to create multiple parallel communication "channels" over the radio interface. This can facilitate a highly efficient utilization of both the available transmit power and the available bandwidth resulting in, e.g., very high data rates within a limited bandwidth without a disproportionate degradation in coverage. For example, under certain conditions, the channel capacity can increase linearly with the number of antennas and avoid saturation in the data capacity and/or rates. These techniques are commonly referred to as "spatial multiplexing" or multiple-input, multiple-output (MIMO) antenna processing.

Accordingly, spatial multiplexing is a key feature to increase the spectral efficiency of wireless systems, including 5G/NR. Transmitting multiple layers on the same time-frequency resource can increase the data-rate for a single user (referred to as "SU-MIMO"). Alternatively, transmitting multiple layers on the same time-frequency resource to multiple users (referred to as "MU-MIMO") can increase the system capacity in number of users.

Even so, transmitting multiple layers on the same resource requires sufficient spatial isolation to keep inter-layer interference at an acceptable level. This can be done by transmitting on different orthogonal polarizations, e.g., vertical and horizontal. Since there are only two orthogonal polarizations, however, this limits spatial multiplexing order to two. This is common in current wireless networks, particularly for SU-MIMO. The main constraint is in the UE, where it is difficult to fit an antenna array of many elements having sufficient spatial separation.

There are three main beamforming techniques: analog, digital, and hybrid (a combination of analog and digital).

Analog beamforming can compensate for high mmW path-loss, while digital precoding can provide additional performance gains necessary to achieve a reasonable coverage. The implementation complexity of analog beamforming is significantly less than digital since it can utilize simple phase shifters, but it is limited in terms of multi-direction flexibility (i.e., a single beam can be formed at a time and the beams are then switched in time domain), transmission bandwidth (i.e., not possible to transmit over a sub-band), inaccuracies in the analog domain, etc.

Digital beamforming, which is often used today in LTE networks, provides the best performance in terms of data rate and multiplexing capabilities. For example, multiple beams over multiple sub-bands can be formed simultaneously. Even so, digital beamforming presents challenges in terms of power consumption, integration, and cost. Furthermore, while cost generally scales linearly with the number of transmit/receive units, the gains of digital beamforming increase more slowly.

FIG. 1A shows an exemplary hybrid transmit beamforming arrangement, which includes baseband processing circuitry (120) coupled to an analog beamformer (BF, 140) via intermediate conversion circuitry (130). The baseband processing circuitry includes a MIMO-related functionality such as layer mapping and precoding. The conversion circuitry can include one or more conversion chains, with multiple conversion chains shown in the figure. Each conversion chain can include an Inverse Fast Fourier Transform (IFFT), a parallel-to-serial (P/S) converter, and a digital-to-analog converter (DAC). The analog beamformer includes a transmitter (142, also referred to as transmit circuitry) and an antenna array (144). Additionally, the arrangement shown in FIG. 1A includes processing/control circuitry (110) that manages and/or controls the baseband processing circuitry, the conversion circuitry, and the transmitter.

FIG. 1B shows an exemplary arrangement of analog beamformer 140. In this arrangement, antenna array 144 includes two panels (or sub-panels), with each panel including eight (8) two-element sub-arrays. Each antenna element provides vertical and horizontal polarization, as indicated by crosses in the respective circles. Transmitter 142 includes an independent beamforming circuit for each panel, with each beamforming circuit including an upconverter (e.g., mixer) from intermediate frequency (IF) to radio frequency (RF), as well as independent phase shifters and power amplifiers (PAs, also referred to as variable gain amplifiers (VGAs)) for each two-element sub-array.

FIG. 1C shows another exemplary arrangement of analog beamformer 140. In this arrangement, antenna array 144 includes one antenna panel with 16 two-element sub-arrays. Each antenna element provides vertical and horizontal polarization, as indicated by crosses in the respective circles. Transmitter 142 includes one beamforming circuit arranged in a similar manner as shown in FIG. 1B. In this exemplary arrangement, only a single conversion chain is needed in conversion circuitry 130 shown in FIG. 1A.

Note that the exemplary transmitters 142 shown in FIGS. 1B-C feed a single polarization on the antenna array 144. Duplicate transmitters 142 can be used to feed the respective horizontal and vertical polarizations on the antenna array 144.

FIG. 1D shows an alternative four-element sub-array that can be substituted for the two-element sub-arrays in either of FIGS. 1B and 1C. This four-element sub-array has two feed ports, one for vertical polarization of all four elements and the other for horizontal polarization of all four elements. Each feed port can be connected to one of the PAs shown in FIGS. 1B-1C.

Although the antenna arrays shown in FIGS. 1B-1C are two-dimensional grids of elements, this is only exemplary. Other exemplary antenna arrays can have linear and/or one-dimensional arrangements of elements.

A beamformer steers the analog beam of each antenna panel toward a single orientation or direction for each polarization on each OFDM symbol. For example, the processing/control circuitry can configure the phase shifters and the PAs associated with each subarray to generate a beam having a desired orientation. The number of subarrays in a panel determines the array gain for the panel. The arrangement shown in FIG. 1B supports one beam per panel per polarization (four total for two panels and two polarizations), while the arrangement shown in FIG. 1C supports only one beam per polarization (two total).

For systems deployed at mmW frequencies, it is common to perform beamforming on the time-domain (TD) signal after OFDM transformation. The beamforming operation can either be performed by analog circuitry or by a digital implementation before digital-to-analog conversion (e.g., in the digital precoding section of FIG. 1A). Since it is difficult to implement several analog beamforming networks (e.g., phase shifters and PAs) behind one antenna element, multi-layer transmission is often implemented with several panels, with each panel transmitting a single layer per polarization.

For TD beamforming, inter-layer isolation is typically provided by spatial nulling of inter-beam/inter-layer interference. In other words, when transmitting one layer, the applied BF weights should create maximal gain towards this layer while the gain should be very low in the directions where the other layers should go.

Beamforming codebooks can be used to reduce signaling requirements. For example, a list of beamforming vectors can be stored in a table in both the network node and the UE, or identified by a particular RS (e.g., a CSI-RS index). By using a fixed and finite codebook of BF vectors, only indices of selected BF vectors need to be sent from a network node's processing unit (also referred to as digital unit or DU) via the interface to a beamforming radio unit.

As a more specific example, a codebook (B) of N beamforming vectors (b1 . . . bN) corresponding to respective orientations (1 . . . N) can be used for coverage of a cell. Such a codebook can also be referred to as a "grid of beams" (GoB). The choice of beamforming vectors (b1 . . . bN) dictates beam parameters such as peak power and width of beam main lobe as well as level of beam sidelobes. Conventional choices for beamforming vectors (b1 . . . bN) produce beam parameters that are unsuitable in some manner, such as too low peak power or too high sidelobes. New techniques are needed to determine beamforming vectors that are more suitable for applications in wireless networks, such as in mmW applications.

SUMMARY

Embodiments of the present disclosure provide specific improvements to beamforming in a wireless network (e.g., radio access network, RAN), such as by providing, enabling, and/or facilitating solutions to overcome exemplary problems summarized above and described in more detail below.

Embodiments include methods (e.g., procedures) for beamforming using an antenna array. These exemplary methods can be performed by a node of a wireless network, such as a network node (e.g., base station, eNB, gNB, ng-eNB, etc. or component thereof) or a user equipment (UE, e.g., wireless device, etc. or component thereof).

These exemplary methods can include, for each pair of beamforming vectors (bk, bl) of a codebook (B) comprising a plurality of beamforming vectors (b1 . . . bN) corresponding to a respective plurality of orientations (1 . . . N), determining at least one corresponding pair of tapering vectors (tk, tl) based on minimizing at least one function f(δ, ϵ), such that when tapered beamforming vectors (tk·bk, tl·bl) are applied to portions of the antenna array for transmitting concurrent beams of orientations (1≤k≤N, 1≤l≤N, k≠l): radiated power in orientations (k, l) are at least (1−ϵ)*(Pk, Pl), where (Pk, Pl) are peak radiated powers in orientations (k, l) of respective beams formed by (bk, bl); and the beams of orientations (k, l) have sidelobes that are lower than δ in respective orientations (l, k).

In some embodiments, f(δ, ϵ)=(δ+α·ϵ) and α≥0. In some embodiments, (1−ϵ)≥0.95.

These exemplary methods can also include transmitting data concurrently in orientations (1≤i≤N, 1≤j≤N, i≠j) based on weighting the portions of the antenna array by the tapered beamforming vectors (ti·bi, tj·bj) corresponding to the orientations (i, j).

In some embodiments, each corresponding pair of tapering vectors (tk, tl) can be further determined such that radiated power in orientations (k, l) are no greater than (Pk, Pl).

In some embodiments, each beamforming vector (b1 . . . bN) and each tapering vector (tk, tl) comprises M values corresponding to respective M portions of the antenna array. In such embodiments, the data is transmitted via respective power amplifiers (PA-1 . . . PA-M) coupled to the M portions of the antenna array. In some embodiments, N can be an integer multiple of M. In some embodiments, the M portions of the antenna array can be respective antenna elements. In other embodiments, the M portions of the antenna array can be respective antenna sub-arrays, with each sub-array including a plurality of antenna elements.

In some embodiments, all corresponding pairs of tapering vectors (tk, tl) can be further determined such that the respective magnitudes of the M values of each tapering vector are less than or equal to 1. In other embodiments, all corresponding pairs of tapering vectors (tk, tl) can be further determined such that the respective magnitudes of the M values of each tapered beamforming vector (tk·bk, tl·bl) are less than or equal to 1. In other embodiments, each corresponding pair of tapering vectors (tk, tl) can be further determined such that the respective sums of the following are less than or equal to one: the squared magnitudes of the M values of tapered beamforming vector tk·bk, and the squared magnitudes of the M values of tapered beamforming vector tl·bl.

In some of these embodiments, all corresponding pairs of tapering vectors (tk, tl) are further determined based on one of the following criteria: the M values of each tapering vector are allowed to be real values or complex values; or the M values of each tapering vector are constrained to be real values.

In some embodiments, these exemplary methods can also include forming a codebook (T) comprising a plurality of entries indicating respective pairs of tapering vectors (tk, tl) determined for orientations (k, l), 1≤k≤N, 1≤l≤N, k≠l. For example, each entry can include a pair of tapering vectors.

In some of these embodiments, transmitting data concurrently can include: selecting an entry (ti, tj) in codebook (T) that corresponds to the orientations (i, j); selecting entries (bi, bj) from codebook (B) that correspond to the orientations (i, j); and forming the tapered beamforming vectors (ti·bi, tj·bj) based on the selected entry from codebook (T) and the selected entries from codebook (B).

In some of these embodiments, the determining operations can include: determining a first pair of tapering vectors (tk-1, tl-1) based on minimizing a first function f(δ1, ϵ), where δ1 is associated with first modulation and coding schemes (MCSk-1, MCSl-1) for the beams of orientations (k, l); and determining a second pair of tapering vectors (tk-2, tl-2) based on minimizing a second function f(δ2, ϵ), where δ2 is associated with second modulation and coding schemes (MCSk-2, MCSl-2) for the beams of orientations (k, l).

In such embodiments, forming the codebook (T) can include storing the first and second pairs of tapering vectors in T in association with orientations (k, l). Additionally, in some variants, selecting an entry (ti, tj) in codebook T can include selecting, as (ti, tj), either the first pair of tapering vectors (ti-1, tj-1) or the second pair of tapering vectors (ti-2, tj-2) based on modulation and coding schemes (MCSi, MCSj) used for the data carried by the beams of orientations (i, j).

In other of these embodiments, the threshold δ is −25 dB relative to the power of the beams of orientations (l, k). Other thresholds relative to beam power can also be used according to requirements of particular applications.

Other embodiments include nodes (e.g., UEs, wireless devices, base stations, eNBs, gNBs, ng-eNBs, etc., or components thereof) configured to perform operations corresponding to any of the exemplary methods described herein. Other embodiments include non-transitory, computer-readable media storing program instructions that, when executed by processing circuitry, configure such nodes to perform operations corresponding to any of the exemplary methods described herein.

These and other embodiments can be more efficient than conventional amplitude tapering techniques, which generate overly-restrictive beams having low sidelobes in many different orientations rather than only in orientations of co-scheduled layers. Additionally, embodiments waste less transmit power due to sidelobe suppression, such that more transmit power is available for the main lobes of concurrent beams. Embodiments also provide flexible tradeoffs between sidelobe suppression and main lobe power based on a configurable interference threshold. Furthermore, beamforming vector codebooks can be kept relatively small since they are only required to include beam weights for individual orientations/users (e.g., SU-MIMO).

These and other objects, features, and advantages of embodiments of the present disclosure will become apparent upon reading the following Detailed Description in view of the Drawings briefly described below.

BRIEF DESCRIPTION OF THE DRAWINGS

FIGS. 10A-F illustrate performance of various embodiments of the present disclosure when used with an 8×4 arrangement of 2×1-element sub-arrays and a 32-vector DFT beamforming codebook.

FIG. 12 illustrates a high-level view of an exemplary 5G/NR network architecture.

FIG. 13 shows a block diagram of an exemplary UE (e.g., wireless device), according to various embodiments of the present disclosure.

FIG. 14 shows a block diagram of an exemplary network node (e.g., base station, eNB, gNB, ng-eNB, etc.), according to various embodiments of the present disclosure.

FIG. 15 shows a block diagram of an exemplary network configured to provide over-the-top (OTT) data services between a host computer and a UE, according to various embodiments of the present disclosure.

DETAILED DESCRIPTION

Figure 1A:
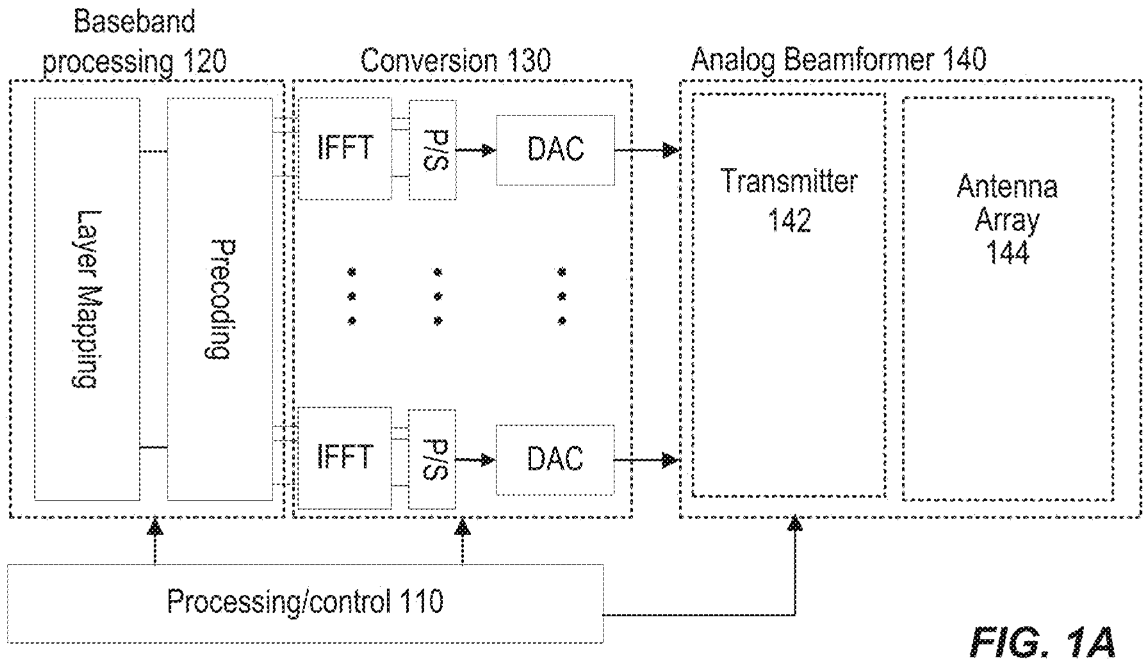
FIGS. 1A-1D show various arrangements for transmit beamforming.
Figure 1B:
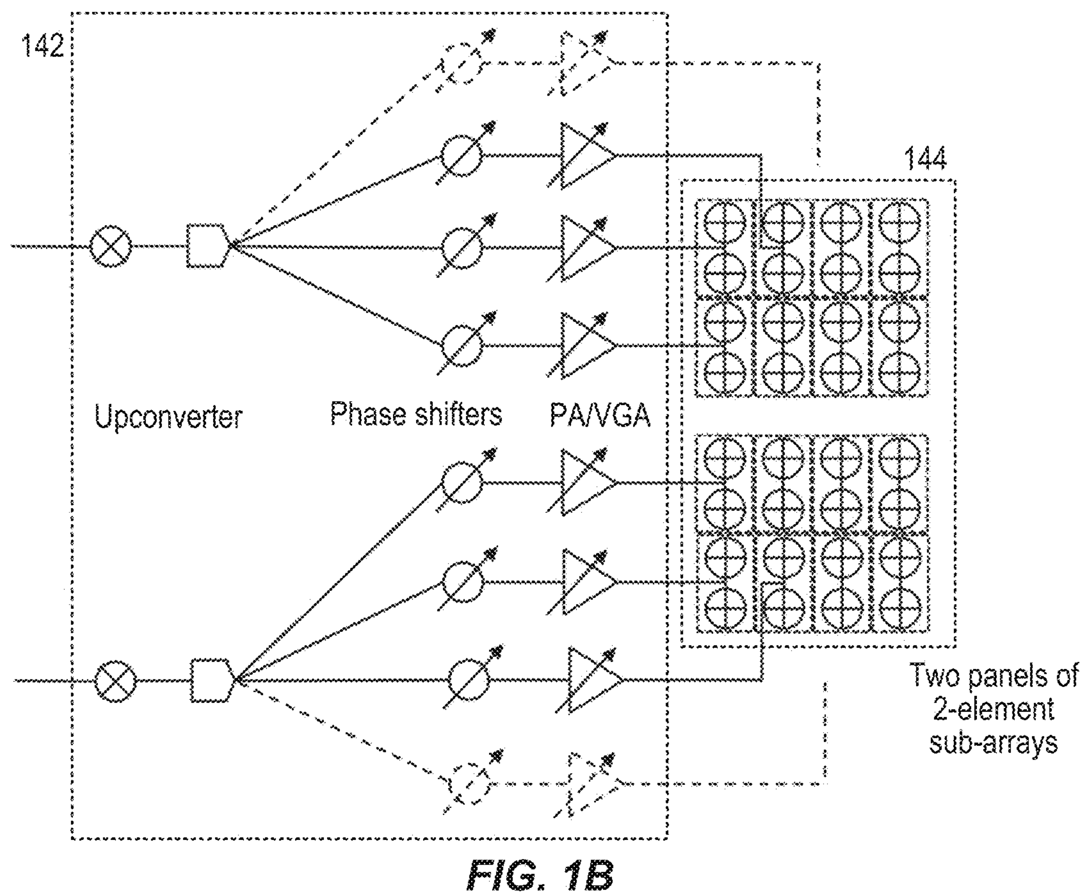
Figure 1C:
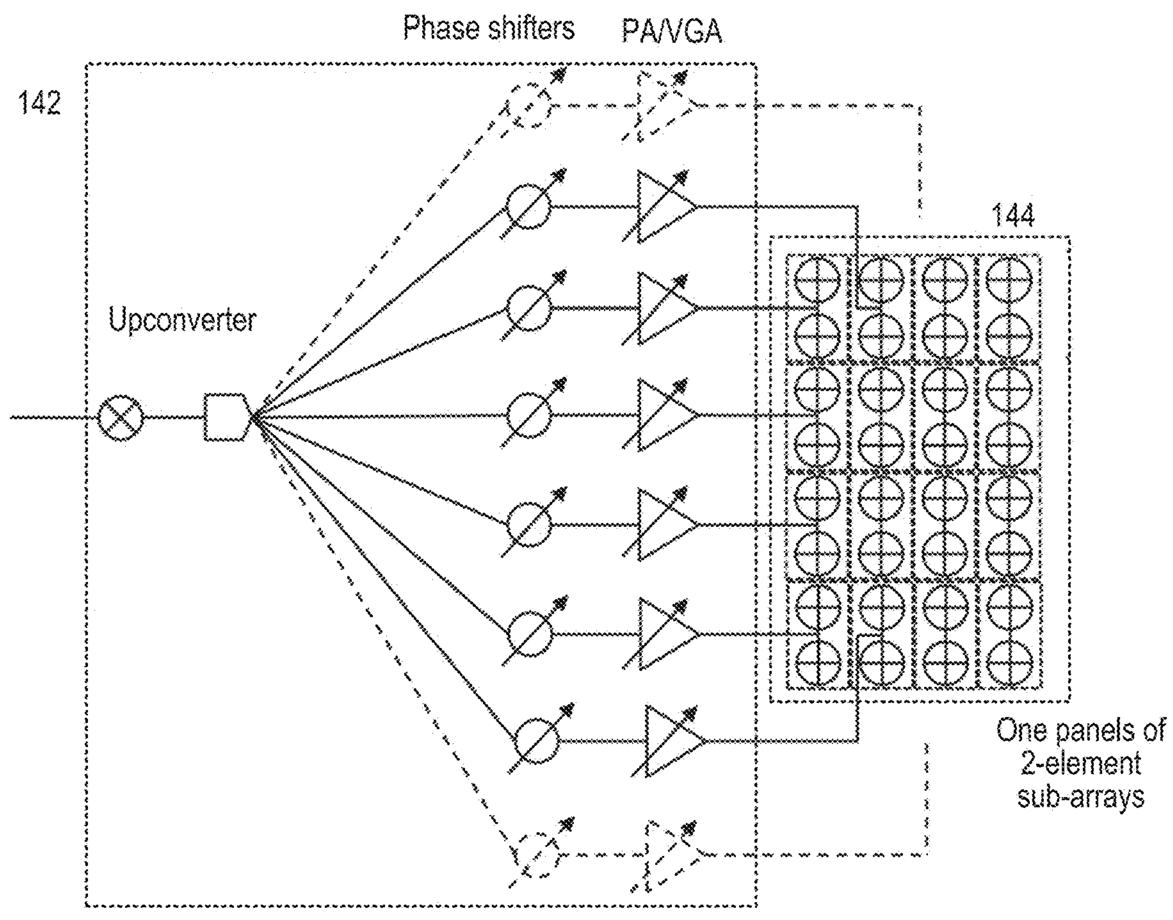
Figure 1D:
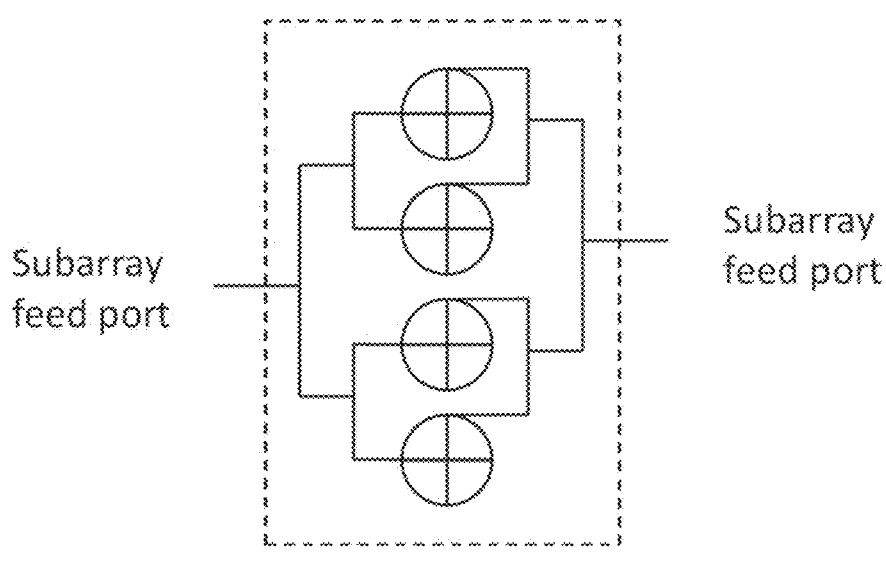

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where a step must necessarily follow or precede another step due to some dependency. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Furthermore, the following terms are used throughout the description given below:

Radio Node: As used herein, a "radio node" can be either a radio access node or a wireless device."

Node: As used herein, a "node" can be a network node or a wireless device.

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VOIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. Unless otherwise noted, the term "wireless device" is used interchangeably herein with the term "user equipment" (or "UE" for short).

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, conventional choices for beamforming vectors (b1 . . . bN) produce beam parameters that are unsuitable in some manner, such as too low peak power or too high sidelobes. This is discussed in more detail below.

Figure 2:
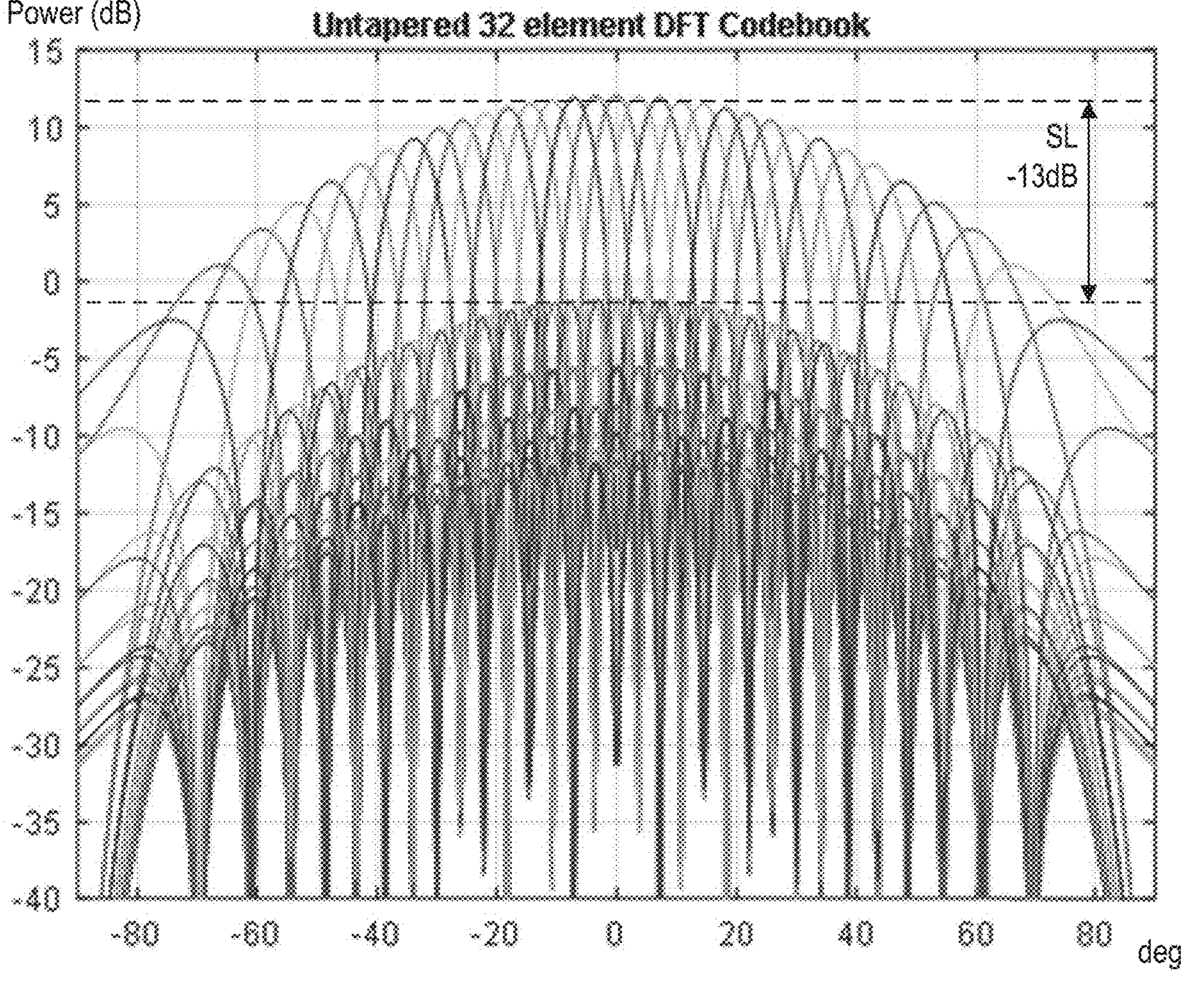
FIG. 2 shows beams of a 32-vector DFT beamforming codebook covering an orientation range of +/−90 degrees.

The maximum gain for a beamformer can be achieved with a codebook of N Discrete Fourier Transform (DFT) vectors. In other words, the vectors (b1 . . . bN) correspond to N different DFT orthogonal basis functions. The DFT vectors provide a set of beams equally spaced in orientation over a range of interest. This arrangement provides the narrowest beam and also full utilization of PAs, but at the expense of high sidelobes. This is illustrated in FIG. 2 for a 32-element DFT codebook (i.e., N=32) covering a range of +/−90 degrees, where the maximum sidelobe for each beam is only 13 dB below the peak for that beam. These high sidelobes produce interference to other beams, which can be problematic when transmitting multiple layers/beams.

Figures 3, 4:
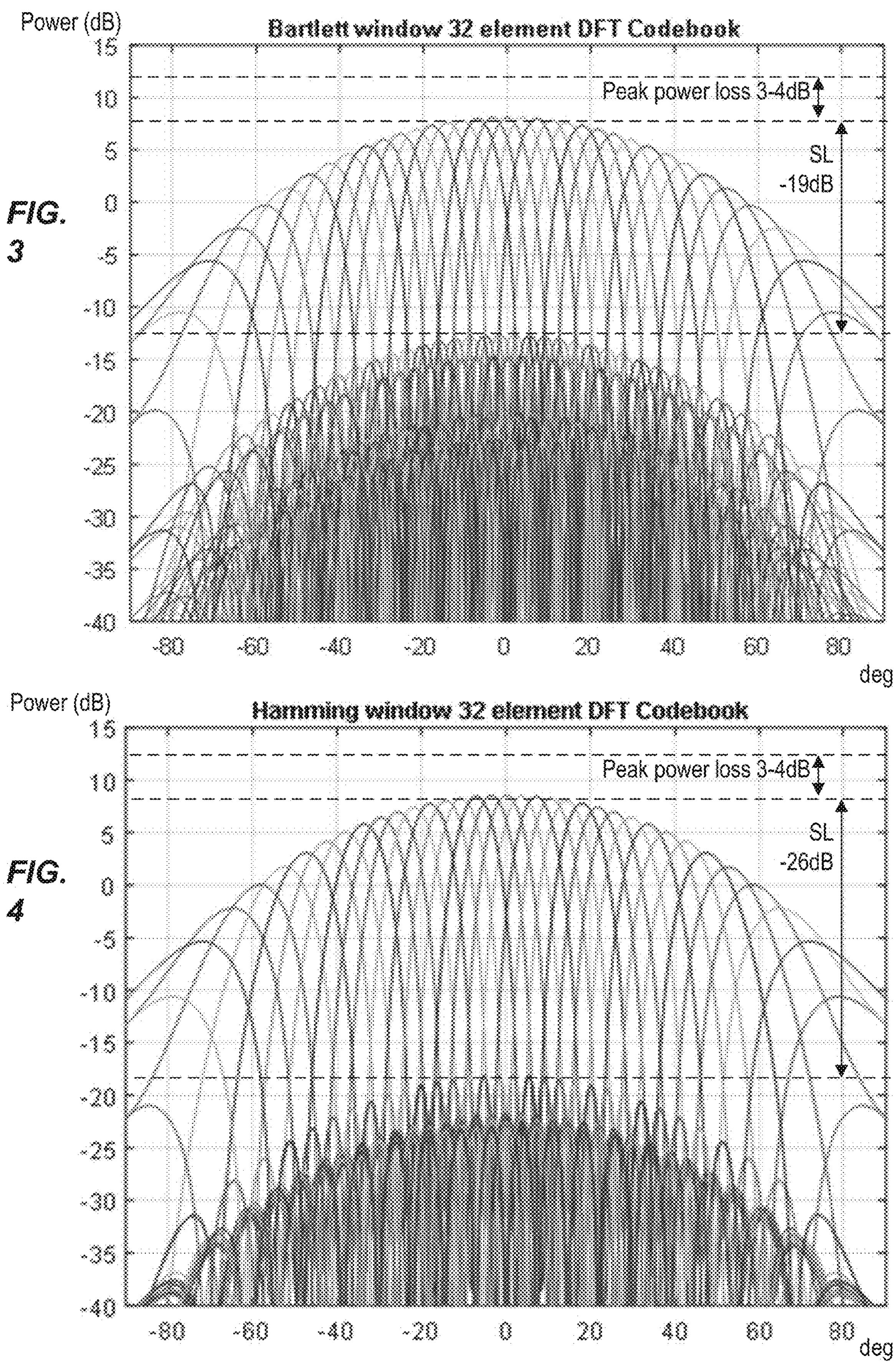
FIG. 3 shows an exemplary arrangement of applying a Bartlett window to each vector of the DFT codebook illustrated in FIG. 2.
FIG. 4 shows another exemplary arrangement of applying a Hamming window to each vector of the DFT codebook illustrated in FIG. 2.

One way to reduce sidelobes and improve layer isolation is amplitude tapering, i.e., by reducing amplitude of certain elements of each beamforming vector (b1 . . . bN) in a systematic way. This is also referred to as "windowing" the beamforming vectors. FIG. 3 shows an exemplary arrangement of applying a Bartlett window to each vector of the 32-element DFT codebook illustrated in FIG. 2. Applying the Bartlett window reduces the maximum sidelobe to ~19 dB below the respective peaks for the beams, but at the expense of a peak power loss of 3-4 dB relative to the non-windowed case shown in FIG. 2.

FIG. 4 shows another exemplary arrangement of applying a Hamming window to each vector of the 32-element DFT codebook illustrated in FIG. 2. Applying the Hamming window reduces the maximum sidelobe to ~26 dB below the respective peaks for the beams, but again at the expense of a peak power loss of 3-4 dB relative to the non-windowed case shown in FIG. 2. Both windows produce beams with wider main lobes than the non-windowed case, with Hamming windowed beams having wider main lobes than Bartlett windowed beams.

Figure 5:
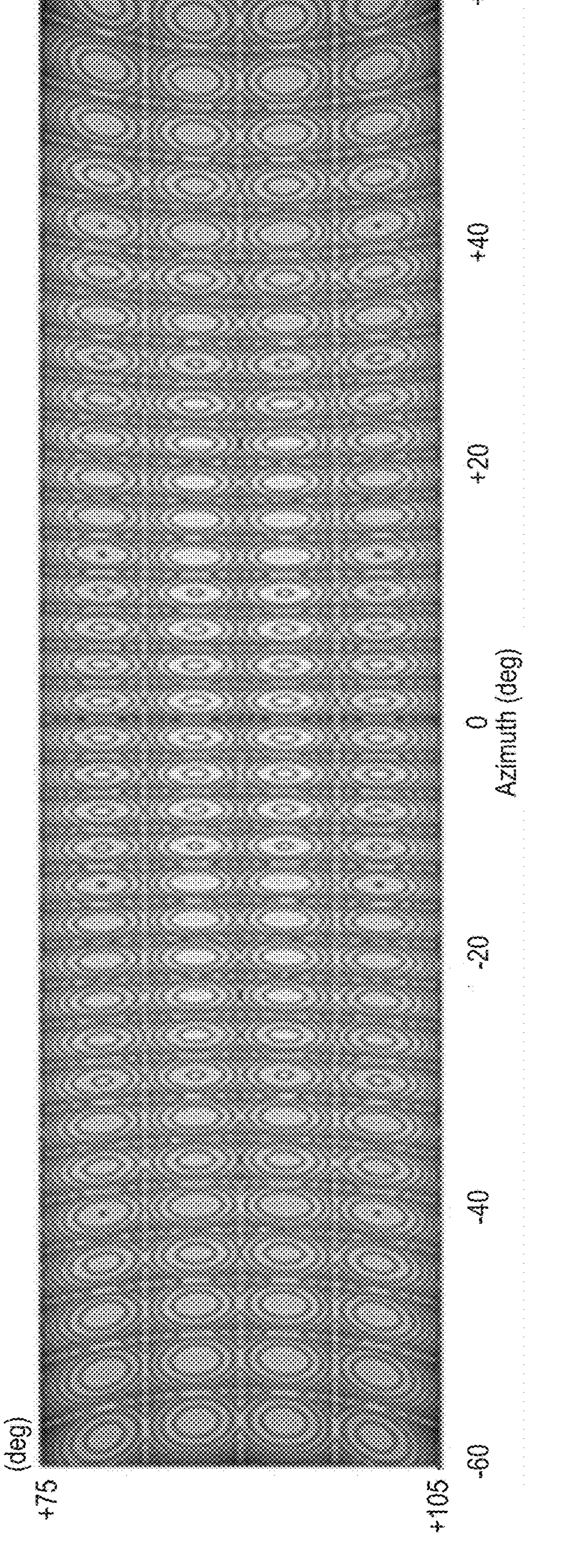
FIG. 5 shows an exemplary 2D DFT codebook used with a planar array of antenna elements.

The examples shown in FIGS. 2-4 are based on a uniform linear array (ULA), but the underlying principles are equally applicable to 2D planar array. FIG. 5 shows an exemplary 2D DFT codebook used with a planar array of antenna elements. This codebook provides a 32×4 GoB arrangement that covers a 120-degree range of azimuth and a 30-degree range of elevation. Lighter shading indicates higher beam directivity and darker shading indicates lower beam directivity.

Note that the above examples involve amplitude-only tapering, which can be implemented simply by adjusting the amplitude (or power) per PA. Introducing phase adjustments to the tapering (e.g., complex window values) increases complexity, particularly for analog beamforming but also for digital precoding. Accordingly, it can be beneficial to use amplitude-only tapering. However, it is also possible to change the phase when using digital beamforming implementations, so complex-valued tapering can be considered for those scenarios.

Even so, the loss of peak power due to the tapering can be problematic. For example, a loss of 3-4 dB as in FIGS. 3-4 can reduce coverage and/or DL capacity in the cell. When the beamforming vectors (b1 . . . bN) are used for transmissions by the UE, the loss of peak power can be very problematic for UL coverage because UEs are already more limited in UL performance due to output power restrictions. The broadening of the beams due to conventional amplitude tapering is also problematic since it increases spatial separation requirements of concurrently transmitted beams.

Applicants have recognized that, in general, the sidelobe suppression provided by conventional amplitude tapering (e.g., as illustrated in FIGS. 3-4) is relatively uniform across the range of orientations outside of the beam's main lobe. Applicants have also recognized that such uniform sidelobe suppression is not necessary in practical implementations. In other words, if two beams are being transmitted concurrently in respective orientations (k, l), then the sidelobe suppression is of particular importance only in orientations (k, l). In other words, the sidelobe for the beam of orientation k must be sufficiently suppressed in orientation l, and the sidelobe for the beam of orientation l must be sufficiently suppressed in orientation k. This requirement can be extended to concurrent transmission of beams in more than two orientations.

In addition to sidelobe suppression, Applicants have also recognized that such beams should have the greatest amount of peak power in the main lobe. In other words, the peak power in orientations (k, l) should be as close to the maximum as technically feasible. Note that the terms "orientation" and "layer" may be used synonymously for MU-MIMO, since it is assumed that each layer is transmitted in a different orientation to a different user.

Using complex-valued tapering instead of real-valued tapering can reduce some of the benefits of a GoB codebook, particularly being able to identify a beam with only an index. Even so, there are still many benefits to using a GoB codebook. For example, many transmissions will still be to a single user such that no tapering weights are needed. Beam management procedures can remain unchanged when using complex-tapered GoB vectors. Initial access, mobility measurements, and procedures for finding "best" beams don't require tapering and hence can be performed using the GoB codebook and corresponding beam indices. In fact, tapering is necessary and/or beneficial in scenarios where multiple beams are transmitted concurrently in different orientations, e.g., to multiple users.

The problem can be formulated as follows for the case of transmission from a network node to multiple UEs. Each UE can report a preferred beamforming vector index (1 . . . N) that identifies one of the beamforming vectors (b1 . . . bN) in the codebook B. In some embodiments, each UE can also report an associated quality measure (e.g., Reference Signal Received Power (RSRP), Reference Signal Received Quality (RSRQ), SINR, etc.) for a DL beam (e.g., CSI-RS, SSB) corresponding to the reported index. Assume that two UEs identify indices (i, j) corresponding to beamforming vectors (bi, bj), and that transmissions to the two UEs will be spatially multiplexed on the same polarization.

Applicants have recognized that it can be beneficial to use amplitude tapering vectors (ti, tj) that maximize the transmitted power in orientations (i, j) while keeping interfering power in orientations (j, i) (i.e., for the concurrently scheduled UE) below an acceptable level or threshold. This can be expressed as the following optimization criteria or problem:

$$\text{Maximize } Ptx(wk, wl) \text{ subject to:} \tag{1}$$

$$|wk^H wl| \le \delta;$$

$$0 \le tk(m)^2 \le p(m),\ 0 \le tl(m)^2 \le p(m),\ 1 \le m \le M; \text{ and}$$

$$1 \le k \le N,\ 1 \le l \le N,\ k \ne l,$$

where Ptx(wk, wl) is radiated power of the antenna array based on selecting (tk, tl); wk=(tk·bk) and wl=(tl·bl) (referred to as "tapered beamforming vectors") are element-wise (or Hadamard) products of tapering and beamforming vectors of the same length, M; "$wk^H$ wl" is the inner product of the two vectors, with superscript "H" denoting Hermitian (complex conjugate transpose); "|x|" denotes absolute value of the argument, x; δ is an interference threshold; and p(m) for (1≤m≤M) are the maximum power output capabilities of the respective PAs (e.g., dBm, mW, W, etc.).

The above problem formulation is for the case when each UE is served from its own part of the antenna panel, such that the UEs are not required to share transmit power. In the case where both UEs are served from a single antenna panel (e.g., via multiple BF networks), a constraint on the total transmit power is also needed. The modified optimization criteria or problem can be expressed as:

$$\begin{aligned}&\text{Maximize } Ptx(wk, wl) \text{ subject to:} \qquad (2)\\&|wk^H wl| \le \delta;\\&0 \le (tk(m)^2 + tl(m)^2) \le p(m),\ 1 \le m \le M; \text{ and}\\&1 \le k \le N,\ 1 \le l \le N,\ k \ne l,\end{aligned}$$

Since the optimization problems given by (1)-(2) are not convex functions of (tk, tl), there are generally no computationally-efficient solutions. Since the beamforming vectors in codebook B are known in advance, one way to solve these non-convex problems is to try all possible solutions by exhaustion. For example, an exhaustive procedure can be done off-line using all possible (quantized) values of (tk, tl) until the optimal values are found. The needed isolation, δ, and available power per branch, p(m), are given by system design. The values can be stored in a look-up-table from which correct tapering vectors can later be retrieved as needed for every pair of orientations (i, j), 1≤i≤N, 1≤j≤N, i≠j.

Nevertheless, there may be various reasons and/or scenarios for which this exhaustive search approach is not a viable solution. For example, the needed sidelobe suppression (or beam isolation) may vary, requiring the exhaustive search to be performed for many different values of δ. Additionally, FIGS. 2-4 discussed above show that higher transmit power utilization can be achieved if sidelobe suppression requirement is relaxed. However, (1)-(2) above provide no ability to trade between the competing goals of maximum output power and sidelobe suppression.

Embodiments of the present disclosure address these and other problems, issues, and/or difficulties by providing computationally-efficient techniques to determine tapering vectors that meet a configurable combination of transmit power utilization and sidelobe suppression when two (or more) spatial layers are transmitted concurrently in different orientations from the same antenna array. For a particular orientation, there will be one tapering vector in a single panel implementation and one tapering vector per panel for multi-panel implementations (e.g., two or more).

Embodiments of the present disclosure can provide various benefits, advantages, and/or solutions to various problems. For example, multi-layer transmission from a TD-BF system can be more efficient compared to conventional amplitude tapering techniques, which generate overly-restrictive beams having low sidelobes in many different orientations rather than only in orientations of co-scheduled layers. Additionally, less power is wasted on suppressing sidelobes in many different orientations, and hence more power is available for the main lobes of the concurrent beams.

Embodiments can also be formulated as convex optimization problems that are amenable to computationally-efficient solutions rather than exhaustive searches used in other techniques. Embodiments also facilitate flexible tradeoffs between sidelobe suppression and main lobe transmit power utilization. The combination of these advantages enables new tapering vectors to be determined rapidly according to changing requirements.

Even so, tapering vectors can be determined offline and/or in a slower timeframe than the symbol-rate transmissions during operations. As such, a codebook T of pairs of tapering vectors (tk, tl) corresponding to orientations (k, l) can be formed for all orientations 1≤k≤N, 1≤l≤N, k≠l. Determining such a codebook depends primarily on parameters such as sidelobe interference threshold δ, transmit power utilization threshold ϵ, and tradeoff factor α. Accordingly, it is possible to determine different codebooks T based on different values of δ, ϵ, and/or α. Several codebooks T can be derived and indexed by, e.g., the degree of sidelobe interference suppression provided and/or degree of transmit power utilization.

Embodiments are described below in the context of a dual-polarized uniform rectangular array (URA) with $N_{TH}$ elements (in row) and $N_{TV}$ elements (in column) for each polarization. Thus, $M=2N_{TH}N_{TV}$ denotes the total number of antenna elements assuming dual polarization. Notations for Hermitian and Hadamard product were previously given above. Tapering vectors (tk, tl) are determined for pairs of beamforming vectors (bk, bl) in codebook B that correspond to orientations (k, l) based on sidelobe interference threshold δ, transmit power utilization threshold ϵ, and tradeoff factor α.

In some embodiments, complex-valued tapering vectors (tk, tl) can be determined based on solving the following convex optimization problem:

$$\begin{aligned}&\text{Minimize } f(\delta, \epsilon) \text{ subject to:} \qquad (3)\\&(1-\epsilon)Pk \le \text{Real}\{bk^H(tk \cdot bk)\} \le Pk,\\&(1-\epsilon)Pl \le \text{Real}\{bl^H(tl \cdot bl)\} \le Pl,\\&|(tk \cdot bk)^H bl| \le \delta;\\&|(tl \cdot bl)^H bk| \le \delta;\\&|tk(m) \cdot bk(m)|^2 + |tl(m) \cdot bl(m)|^2 \le 1; \text{ and}\\&1 \le k \le N,\ 1 \le l \le N,\ k \ne l,\ 1 \le m \le M,\end{aligned}$$

where (Pk, Pl) are peak radiated powers in orientations (k, l) of respective beams formed by (bk, bl), i.e., the non-tapered beam vectors. As an example, f(δ, ϵ)=(δ+α·ϵ) and α≥0. Alternately, the minimization target can be expressed as f(δ, ϵ, α).

Note that a solution to (3) minimizes f(δ, ϵ) such that transmit power utilization in the main lobes of orientations (k, l) are within ϵ of the peak power of non-tapered beams while interference from sidelobes of the opposite beam (i.e., orientations (l, k)) is less than δ in orientations (k, l). Input parameter a provides a tradeoff between how much transmit power utilization exceeds ϵ and how much sidelobe suppression is less than δ.

The optimization problem formulated in (3) is based on the two beams being transmitted from the same antenna panel. If the two beams are transmitted from different antenna panels, then the next-to-last line of (3) can be replaced with one of the following constraints:

$$|tk(m)\cdot bk(m)|^2 \le 1 \text{ and } |tl(m)\cdot bl(m)|^2 \le 1; \text{ or} \tag{3a}$$

$$|tk(m)|^2 \le 1 \text{ and } |tl(m)|^2 \le 1. \tag{3b}$$

In other embodiments, real-valued, non-negative tapering vectors (tk, tl) can be determined based on solving the following convex optimization problem:

$$\begin{aligned} &\text{Minimize } f(\delta, \epsilon) \text{ subject to:} \\ &(1-\epsilon)Pk \le \text{Real}\{bk^H(tk\cdot bk)\} \le Pk, \\ &(1-\epsilon)Pl \le \text{Real}\{bl^H(tl\cdot bl)\} \le Pl, \\ &|(tk\cdot bk)^H bl| \le \delta; \\ &|(tl\cdot bl)^H bk| \le \delta; \\ &tk(m) \text{ and } tl(m) \text{ are real numbers} \ge 0; \\ &|tk(m)\cdot bk(m)|^2 + |tl(m)\cdot bl(m)|^2 \le 1; \text{ and} \\ &1 \le k \le N,\ 1 \le l \le N,\ k \ne l,\ 1 \le m \le M. \end{aligned} \tag{4}$$

Similar to (3) above, an example function to be minimized is f(δ, ϵ)=(δ+α·ϵ) and α≥0. Alternately, the minimization target can be expressed as f(δ, ϵ, α).

The optimization problem formulated in (4) is based on the two beams being transmitted from the same antenna panel. If the two beams are transmitted from different antenna panels, then the next-to-last line of (4) can be replaced with one of the following constraints:

$$|tk(m)\cdot bk(m)|^2 \le 1 \text{ and } |tl(m)\cdot bl(m)|^2 \le 1; \text{ or} \tag{4a}$$

$$|tk(m)|^2 \le 1 \text{ and } |tl(m)|^2 \le 1. \tag{4b}$$

Figure 6:
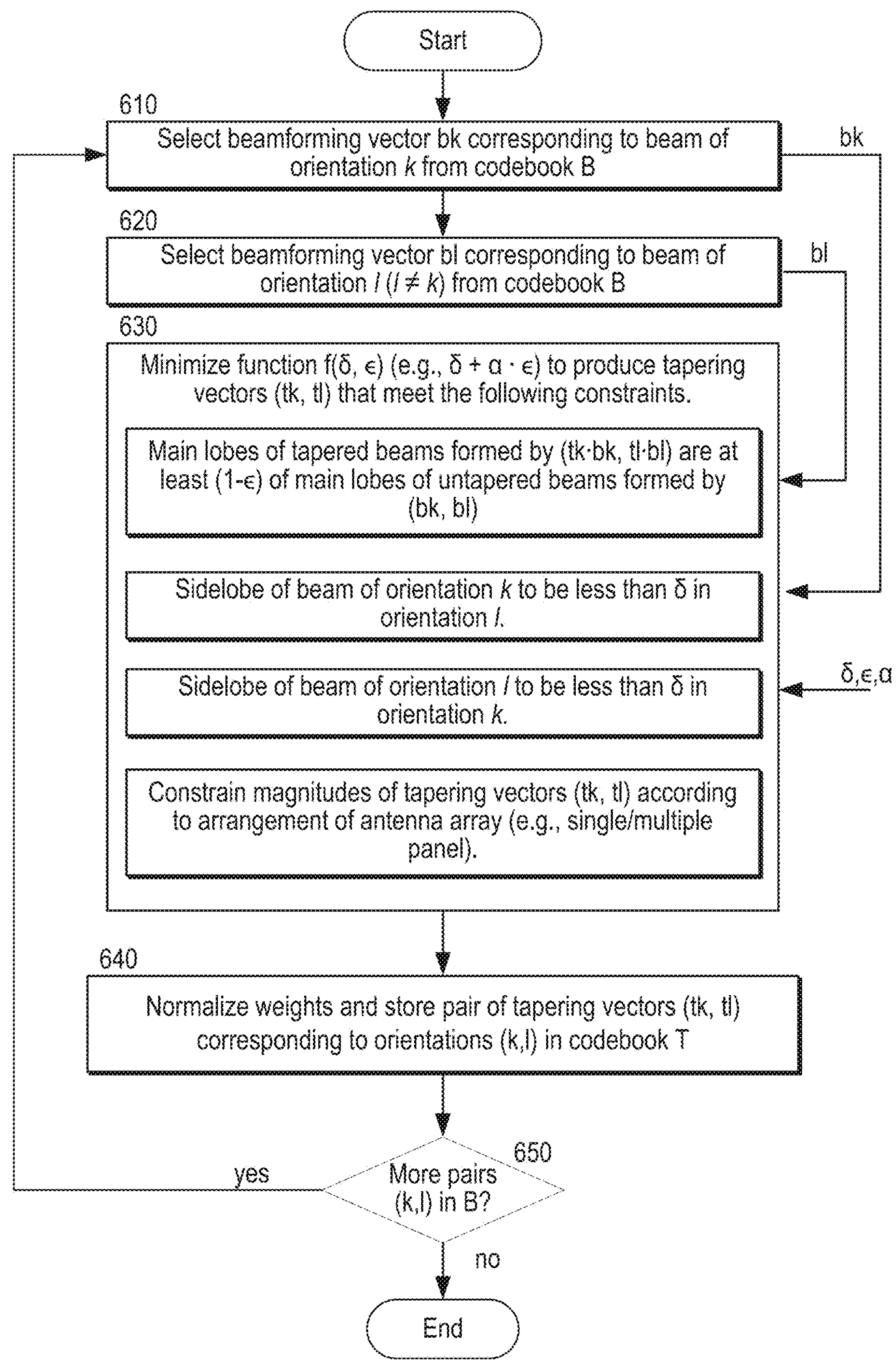
FIG. 6 shows a flow diagram of an exemplary method for determining a codebook of tapering vectors for use with a DFT beamforming codebook, according to various embodiments of the present disclosure.

FIG. 6 shows a flowchart of an exemplary procedure for determining a codebook (T) of complex- or real-valued tapering vectors based on solving the convex optimization problems expressed in (3) and (4), respectively. The operations shown in FIG. 6 can be performed by a node that will use the resulting codebook T for tapering beams from a DFT codebook B, or it can be performed by a first node (or network function) and the codebook T provided to a second node that applies the tapering. The following description does not distinguish between these cases.

In operations 610-620, the node selects beamforming vectors bk and bl corresponding to beams of orientation (k, l) from codebook B, with the further requirement that k≠l. These selected beamforming vectors are inputs to operation 630, where the node minimize a function f(δ, ϵ) to produce tapering vectors (tk, tl) that meet various constraints. For example, f(δ, ϵ)=δ+α·ϵ, with α≥0 being an additional input to the operation 630. The constraints include:

1. Main lobes of tapered beams formed by (tk·bk, tl·bl) are at least (1−ϵ) of main lobes of non-tapered beams formed by (bk, bl);
2. Sidelobe of beam of orientation k is less than δ in orientation/;
3. Sidelobe of beam of orientation/is less than δ in orientation k; and
4. Magnitudes of tapering vectors (tk, tl) are constrained according to arrangement of antenna array (e.g., single/multiple panel).

Different examples of the fourth constraint were discussed above, e.g., (3a)-(3b) and (4a)-(4b). Additionally, in some embodiments, a fifth constraint will be that the elements of tapering vectors (tk, tl) are constrained to be real and positive.

Upon identifying a pair of tapering vectors (tk, tl) that meet these constraints, in operation 640 the node stores the pair of tapering vectors (tk, tl) corresponding to orientations (k,l) in codebook T, such that the pair of tapering vectors (tk, tl) can be later retrieved as needed based on a reference to orientations (k, l). The node may normalize the values of the tapering vectors before storing, e.g., so that tk(m) and tl(m) are less than or equal to 1 for all 1≤m≤M.

In operation 650, the node checks if codebook B includes other pairs of orientations (k, l), k≠l that have no corresponding entries in codebook T. If so, operation returns to 610-620, where the node selects beamforming vectors bk and bl corresponding to one of these other pairs of orientations (k, l), k≠l, and then repeats operation 630. On the other hand, if operation 650 indicates that codebook B includes no other pairs of orientations (k, l), k≠l without corresponding entries in codebook T, the codebook T is considered complete, and the procedure stops.

FIGS. 7A-B, 8A-B, and 9A-B illustrate the performance of certain embodiments that utilize real- or complex-valued tapering vectors (tk, tl), 1≤k≤N, 1≤l≤N, k≠l, that are determined in the manner discussed above. These embodiments are based on an eight-element (M=8) uniform linear array (ULA) and a 32-vector (N=32) DFT beamforming codebook (B). In particular the ULA elements have a half-wavelength (λ/2) inter-element spacing.

Figure 7A:
FIGS. 7A-B, 8A-B, and 9A-B illustrate performance of various embodiments of the present disclosure when used with an eight-element uniform linear array (ULA) and a 32-vector DFT beamforming codebook.
Figure 7A:
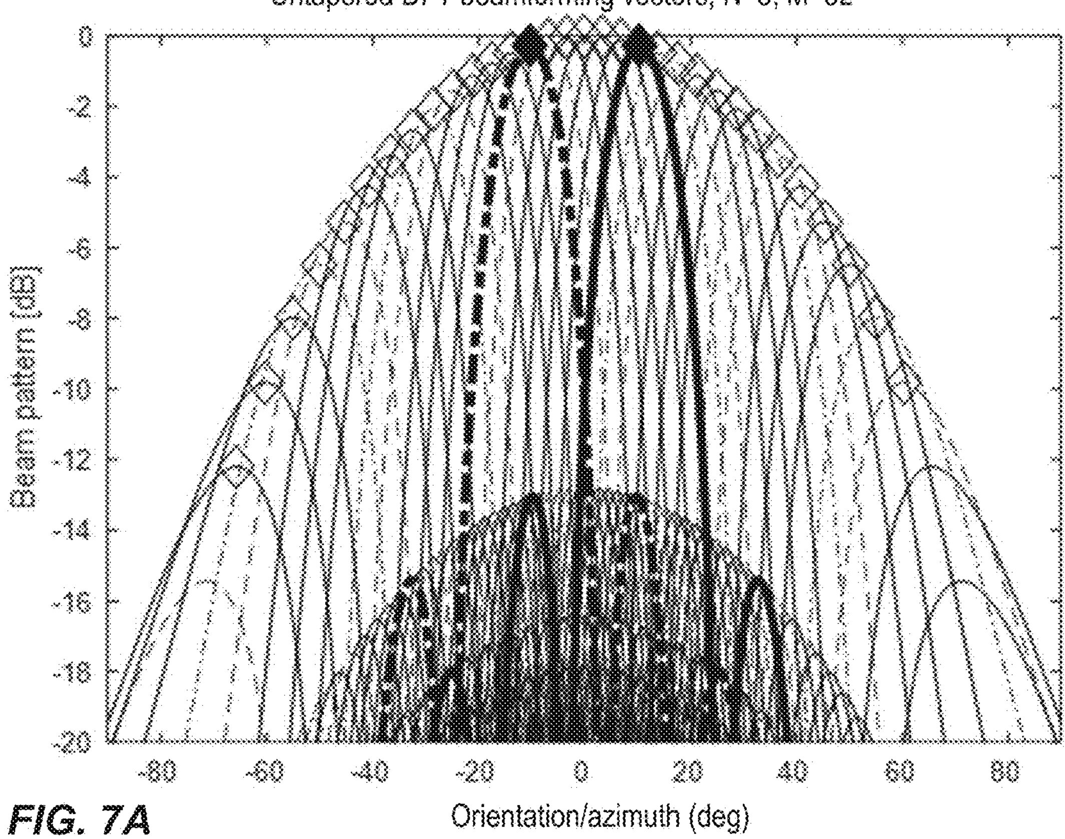
Figure 7B:
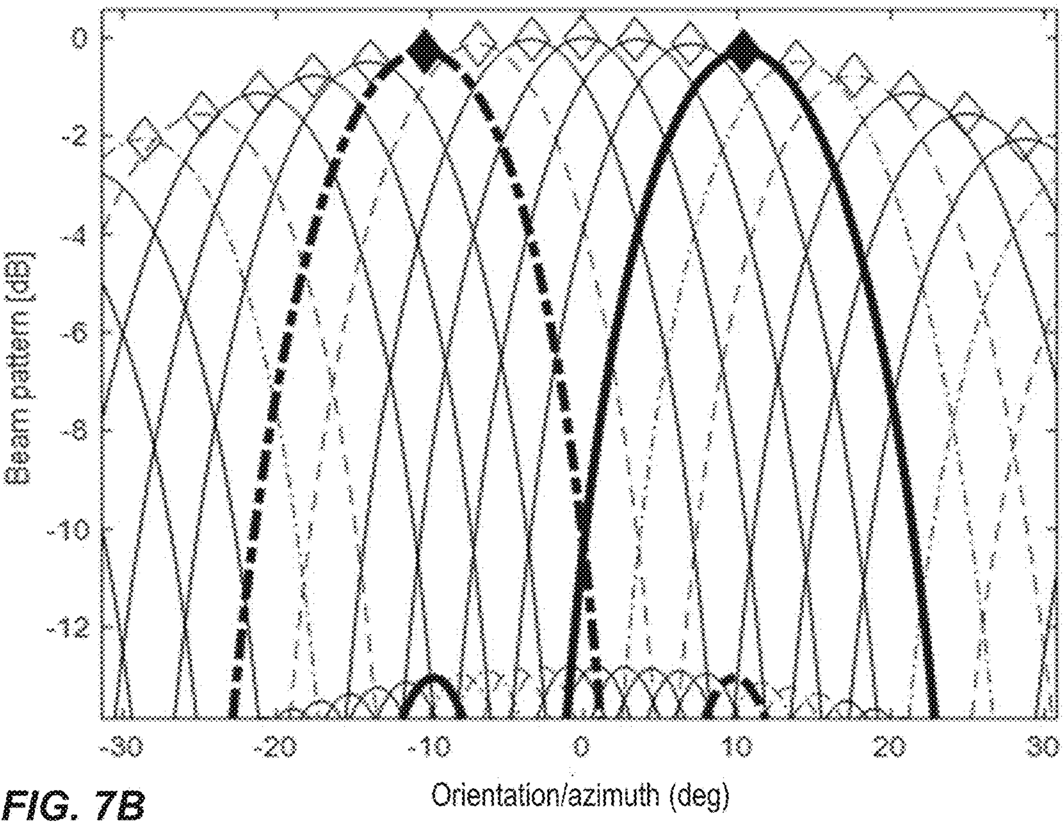

FIG. 7A shows the 32 beams of the DFT codebook (B), with two particular beams (bk, bl) of orientations (k, l) highlighted in bold. In the figure, these two beams are associated with particular UEs, i.e., UE1 (bk) and UE2 (bl). The array is configured to have a 90-degree half-power beamwidth, i.e., beams oriented at ~+/−45 degrees have 3 dB less peak transmit power than a beam oriented at ~0 degrees. FIG. 7B shows a view of the beams in narrower ranges of orientation and beam attenuation. It is apparent that the sidelobes of the beams of orientation (k, l) are ~13 dB below the main lobes in opposite orientations (l, k).

Figure 8A:
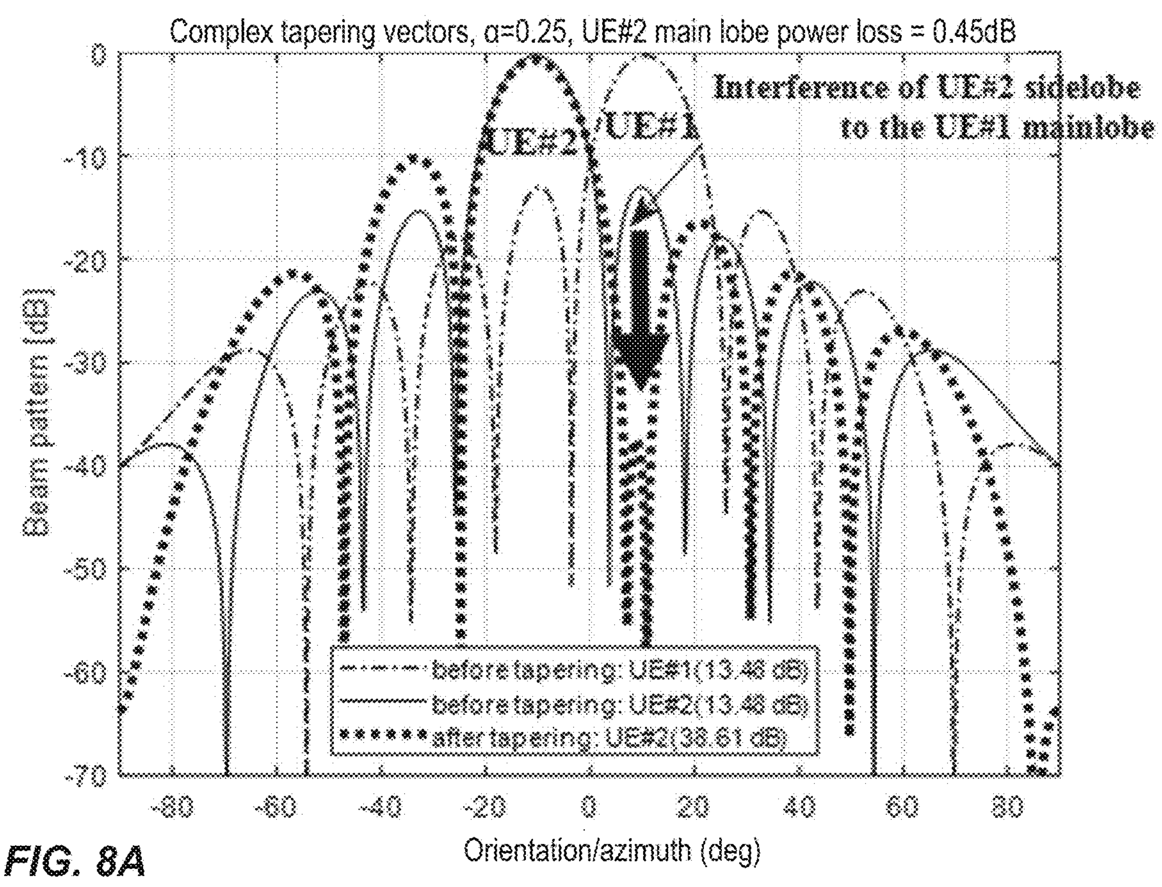

FIG. 8A shows the performance of complex-valued tapering vectors (tk, tl), k≠l, that are determined based on minimizing f(δ, ϵ)=(δ+α·ϵ) in (3) with α=0.25. The figure shows that the sidelobe of bl in orientation k is reduced from −13.48 dB to −38.61 dB by applying the determined tapering vector tl (i.e., tl·bl). At the same time, applying tapering vector tl only causes 0.45 dB in transmit power loss to the main lobe in orientation l.

Figure 8B:
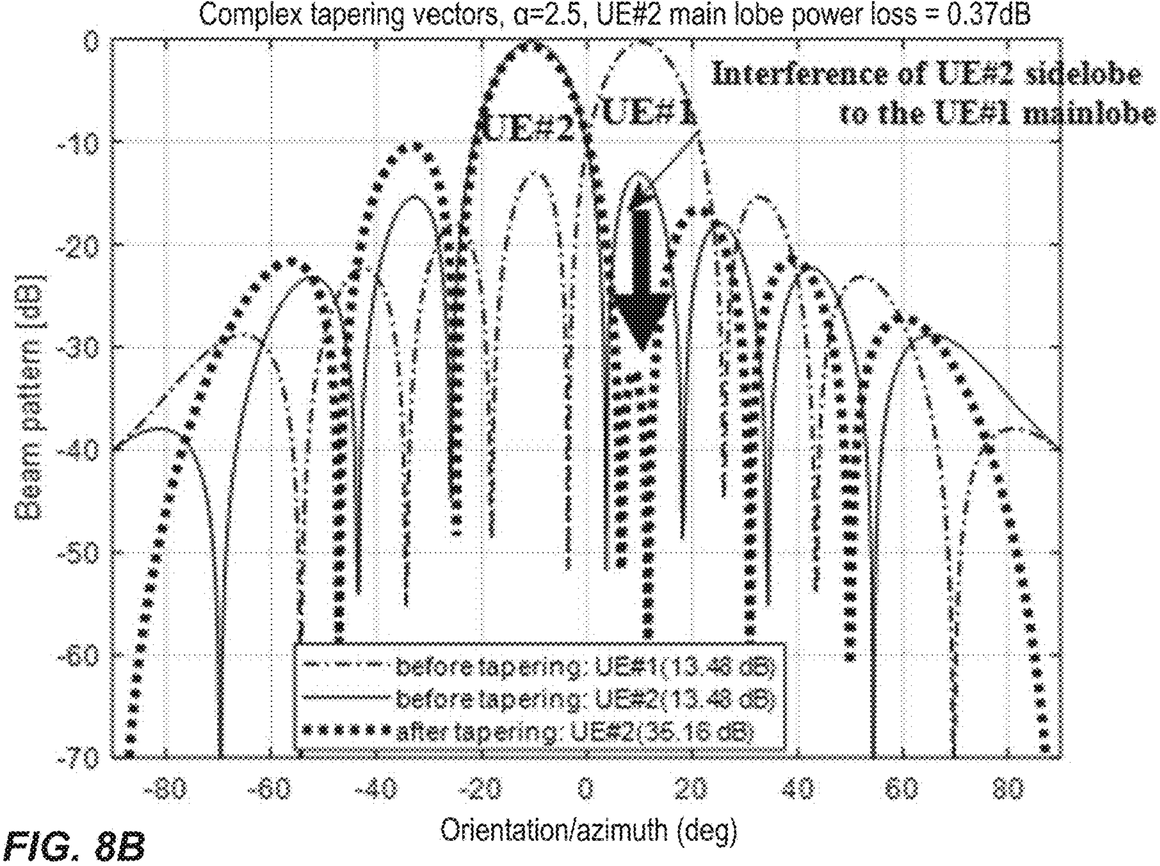

FIG. 8B shows the performance of complex-valued tapering vectors (tk, tl), k≠l, that are determined based on minimizing f(δ, ϵ)=(δ+α·ϵ) in (3) with α=2.5. The figure shows that the sidelobe of bl in orientation k is reduced from −13.48 dB to −35.16 dB by applying the determined tapering vector tl (i.e., tl·bl). At the same time, applying tapering vector tl only causes 0.37 dB in transmit power loss to the main lobe in orientation/. This illustrates possible tradeoffs between sidelobe suppression and main lobe transmit power utilization based on choice of a to use in solving the optimization problem of (3) for complex-valued tapering vectors.

Figure 9A:
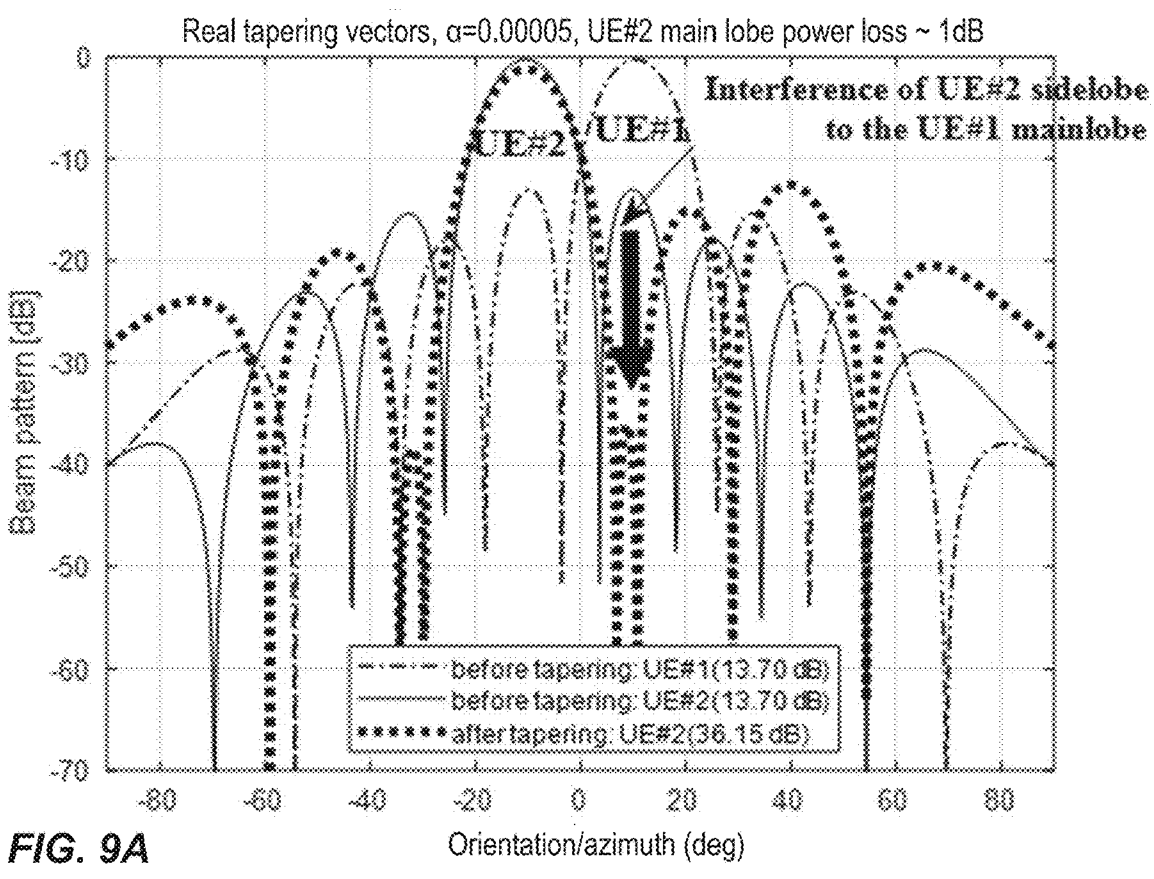

FIG. 9A shows the performance of real-valued tapering vectors (tk, tl), k≠l, that are determined based on minimizing $f(\delta, \epsilon)=(\delta+\alpha\cdot\epsilon)$ in (4) with $\alpha=0.00005$. The figure shows that the sidelobe of bl in orientation k is reduced from −13.7 dB to −36.15 dB by applying the determined tapering vector tl. At the same time, applying tapering vector tl causes 1 dB in transmit power loss to the main lobe in orientation/.

Figure 9B:
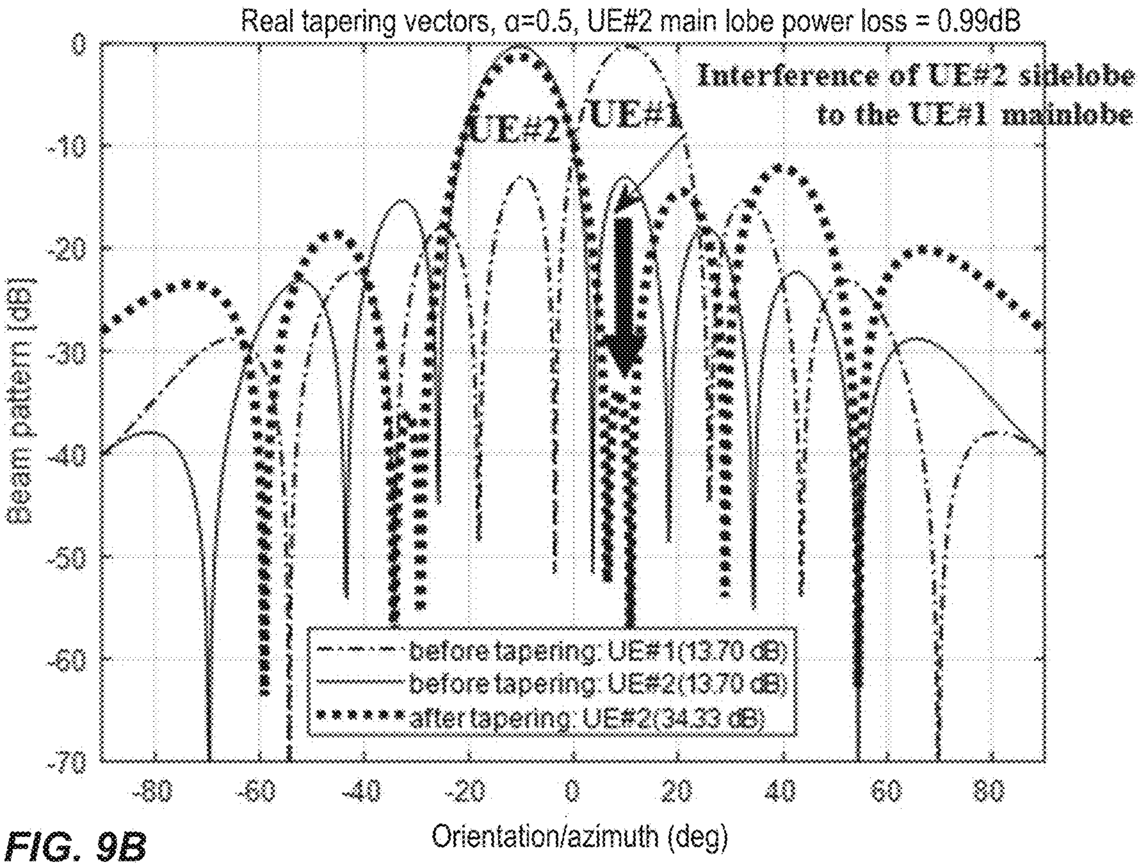

FIG. 9B shows the performance of real-valued tapering vectors (tk, tl), k≠l, that are determined based on minimizing $f(\delta, \epsilon)=(\delta+\alpha\cdot\epsilon)$ in (4) with $\alpha=0.5$. The figure shows that the sidelobe of bl in orientation k is reduced from −13.7 dB to −34.33 dB by applying the determined tapering vector tl. At the same time, applying tapering vector tl causes 0.99 dB in transmit power loss to the main lobe in orientation l. This illustrates possible tradeoffs between sidelobe suppression and main lobe transmit power utilization based on choice of a when solving the optimization problem of (4) for real-valued tapering vectors.

FIGS. 10A-F further illustrate the performance of certain embodiments that utilize tapering vectors (tk, tl), 1≤k≤N, 1≤l≤N, k≠l, that are determined in the manner discussed above. These embodiments are based on an 8×4 rectangular arrangement of 2×1-element sub-arrays (M=32 sub-arrays) operating at 3.5 GHz transmission frequency with each port feeding a 2×1-element subarray. The ports (or subarrays) are spaced 0.5λ horizontally and 1.4λ vertically. A 32×16-vector (N=512) DFT beamforming codebook (B) is used, with 4× oversampling in each dimension of the array (i.e., 8×4=32, 4×4=16).

FIGS. 10A-F illustrate performance for the case for two beams (bk, bl) of orientations (0°, 81°) and (−3°, 97°). In each figure, the circled cross corresponds to location of a desired beam and the non-circled cross corresponds to location of an interfering beam. The darkness of the shading at each point on the 2D grid corresponds to the signal-to-leakage ratio (SLR) at that point. In other words, lighter shading corresponds to a lower SLR between signal of a desired beam and an interfering sidelobe of the other beam (e.g., higher sidelobe), with darker shading corresponding to a higher SLR (e.g., lower sidelobe). A scale mapping colors/shading to SLR (in dB) is shown with the figures.

FIG. 10A illustrates SLR=15 dB for bk at (0, 81°) and FIG. 10B illustrates SLR=14.6 dB for bl at (−3°, 97°). FIGS. 10C-D show results when real-valued tapering vectors (tk, tl) determined based on minimizing $f(\delta, \epsilon)=(\delta+0.5\cdot\epsilon)$ in (4) are applied. In particular, FIG. 10C illustrates SLR=27.6 dB for bk at (0°, 81°) and FIG. 10D illustrates SLR=29.0 dB for bl at (−3°, 97°). In this example, the main lobe transmit power utilization after applying (tk, tl) is (0.53, 0.56) dB less than when using non-tapered beams (bk, bl).

Figures 10E, 10F:
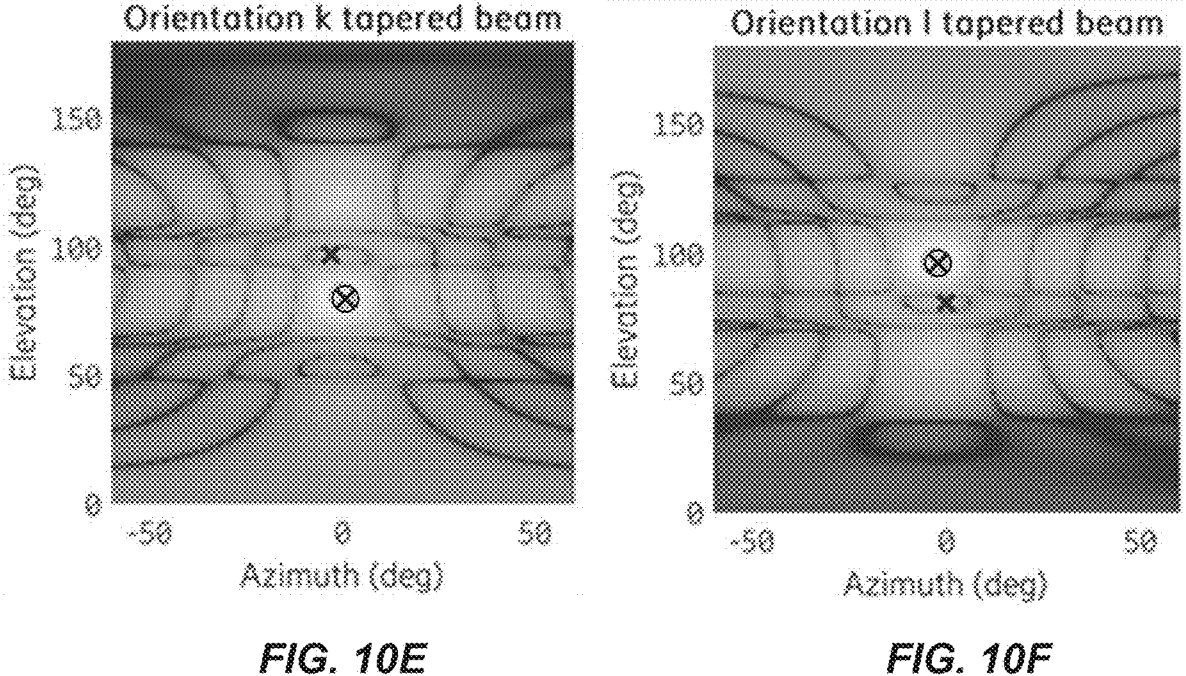

FIGS. 10E-F show results when complex-valued tapering vectors (tk, tl) determined based on minimizing $f(\delta, \epsilon)=(\delta+1.5\cdot\epsilon)$ in (3) are applied. In particular, FIG. 10E illustrates SLR=29.9 dB for bk at (0°, 81°) and FIG. 10F illustrates SLR=31.0 dB for bl at (−3°, 97°). In this example, the main lobe transmit power utilization after applying (tk, tl) is (0.51, 0.56) dB less than when using non-tapered beams (bk, bl).

Figure 11:
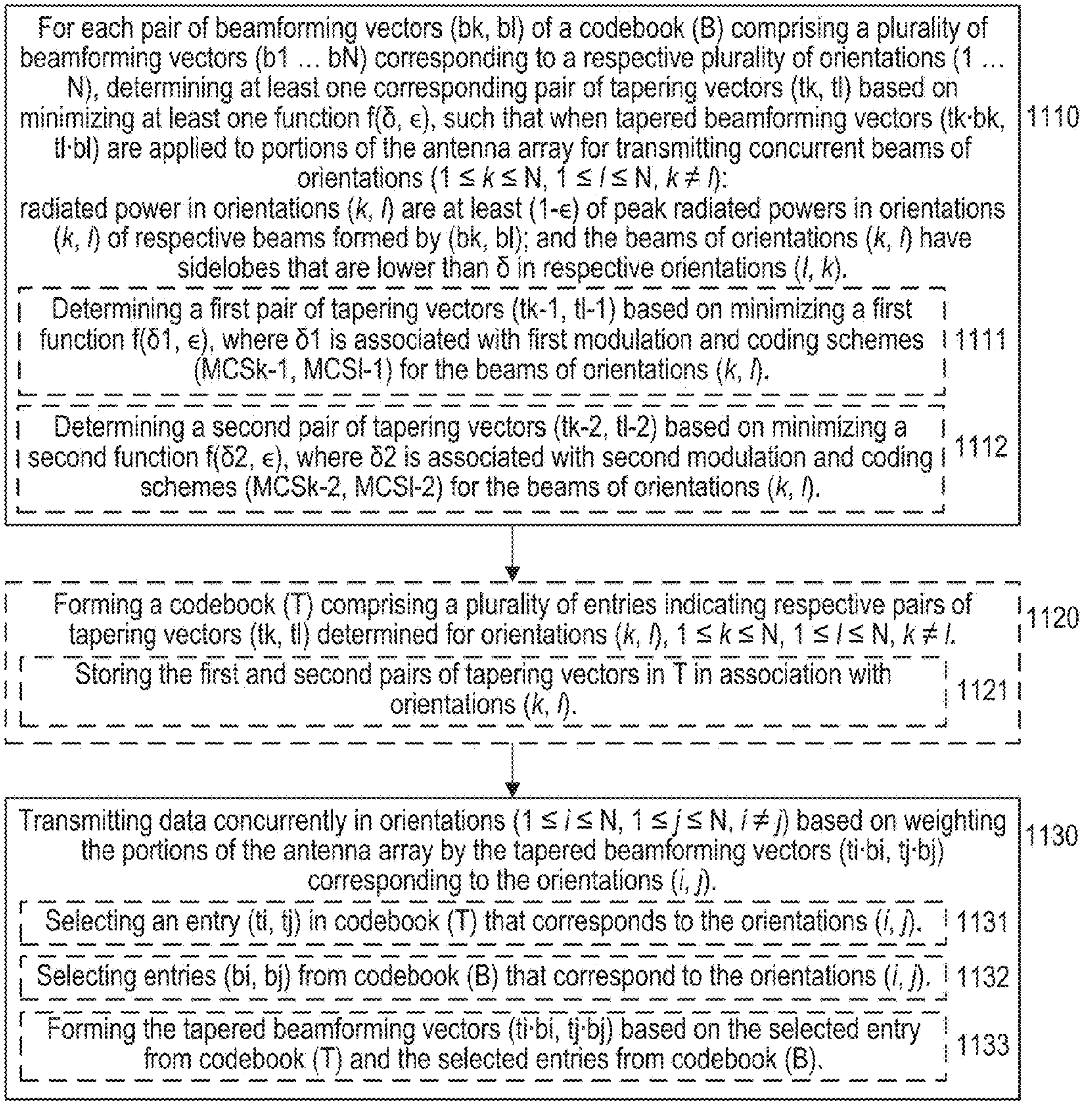
FIG. 11 shows a flow diagram of an exemplary method for a node (e.g., UE, wireless device, base station, eNB, gNB, ng-eNB, etc.) of a wireless network, according to various embodiments of the present disclosure.

Various features of the embodiments described above correspond to various operations illustrated in FIG. 11, which shows an exemplary method (e.g., procedure) for beamforming using an antenna array. The method can be performed by a node of a wireless network, such as a network node (e.g., base station, eNB, gNB, ng-eNB, etc. or component thereof) or a UE (e.g., wireless device, etc. or component thereof) such as described elsewhere herein. Although FIG. 11 shows specific blocks in a particular order, the operations of the exemplary method can be performed in different orders than shown and can be combined and/or divided into blocks having different functionality than shown. Optional blocks or operations are indicated by dashed lines.

The exemplary method can include the operations of block 1110, where the node can, for each pair of beamforming vectors (bk, bl) of a codebook (B) comprising a plurality of beamforming vectors (b1 . . . bN) corresponding to a respective plurality of orientations (1 . . . N), determine at least one corresponding pair of tapering vectors (tk, tl) based on minimizing at least one function $f(\delta, \epsilon)$, such that when tapered beamforming vectors (tk·bk, tl·bl) are applied to portions of the antenna array for transmitting concurrent beams of orientations (1≤k≤N, 1≤l≤N, k≠l):

- radiated power in orientations (k, l) are at least (1−ε)*(Pk, Pl), where (Pk, Pl) are peak radiated powers in orientations (k, l) of respective beams formed by (bk, bl); and
- the beams of orientations (k, l) have sidelobes that are lower than δ in respective orientations (l, k).

In some embodiments, $f(\delta, \epsilon)=(\delta+\alpha\cdot c)$ and $\alpha\geq 0$. In some embodiments, $(1-\epsilon)\geq 0.95$. For example, the operations of block 1110 can be used for solution of any of the optimization problems described above.

The exemplary method can also include the operations of block 1130, where the node can transmit data concurrently in orientations (1≤i≤N, 1≤j≤N, i≠j) based on weighting the portions of the antenna array by the tapered beamforming vectors (ti·bi, tj·bj) corresponding to the orientations (i, j).

In some embodiments, each corresponding pair of tapering vectors (tk, tl) can be further determined such that radiated power in orientations (k, l) are no greater than (Pk, Pl).

In some embodiments, each beamforming vector (b1 . . . bN) and each tapering vector (tk, tl) comprises M values corresponding to respective M portions of the antenna array. In such embodiments, the data is transmitted (e.g., in block 1130) via respective power amplifiers (PA-1 . . . PA-M) coupled to the M portions of the antenna array. In some embodiments, N can be an integer multiple of M, such as the example of N=32 and M=8 discussed above.

In some embodiments, the M portions of the antenna array can be respective antenna elements. In other embodiments, the M portions of the antenna array can be respective antenna sub-arrays, with each sub-array including a plurality of antenna elements. In either case, the M values of the tapered beamforming vectors are used to weight the respective M portions, e.g., in block 1130.

In some embodiments, all corresponding pairs of tapering vectors (tk, tl) can be further determined such that the respective magnitudes of the M values of each tapering vector are less than or equal to 1. An example of these embodiments is the optimization constraints of (3b) and (4b) above. In other embodiments, all corresponding pairs of tapering vectors (tk, tl) can be further determined such that the respective magnitudes of the M values of each tapered beamforming vector (tk·bk, tl·bl) are less than or equal to 1. An example of these embodiments is the optimization constraints of (3a) and (4a) above.

In other embodiments, each corresponding pair of tapering vectors (tk, tl) can be further determined such that the respective sums of the following are less than or equal to one:

- the squared magnitudes of the M values of tapered beamforming vector tk·bk, and
- the squared magnitudes of the M values of tapered beamforming vector tl·bl.

An example of these embodiments is the optimization constraints of (3) and (4) above, i.e., for the single antenna panel configuration.

In some of these embodiments, all corresponding pairs of tapering vectors (tk, tl) are further determined based on one of the following criteria:

the M values of each tapering vector are allowed to be real values or complex values (e.g., as in (3) above); or the M values of each tapering vector are constrained to be real values (e.g., as in (4) above).

In some embodiments, each of the M values of each tapering vector is from the set (v1 . . . vR), where $R=2^r$. For example, r can be the number of bits used to represent each of the M values. In some embodiments, r can be less than or equal to six (6).

In some embodiments, the exemplary method can also include the operations of block 1120, where the node can form a codebook (T) comprising a plurality of entries indicating respective pairs of tapering vectors (tk, tl) determined for orientations (k, l), 1≤k≤N, 1≤l≤N, k≠l. For example, each entry can include a pair of tapering vectors.

In some of these embodiments, transmitting data concurrently in block 1130 can include the operations of sub-blocks 1131-1133. In sub-blocks 1131-1132, the node can select an entry (ti, tj) in codebook (T) that corresponds to the orientations (i, j) and select entries (bi, bj) from codebook (B) that correspond to the orientations (i, j). In sub-block 1133, the node can form the tapered beamforming vectors (ti·bi, tj·bj) based on the selected entry from codebook (T) and the selected entries from codebook (B). These vectors can then be used to weight the M portions of the antenna array.

The operations of block 1110 are described above as determining at least one corresponding pair of tapering vectors (tk, tl) for each pair of beamforming vectors (bk, bl) of a codebook (B). However, this should not be understood as requiring an entire codebook (T) of tapering vector pairs to be determined prior to transmitting data. For example, each pair of tapering vectors (ti, tj) could be determined as needed for concurrent transmission in orientations (i, j). Once determined, such tapering vectors can be stored in the codebook (T) for later use.

In some of these embodiments, the determining operations of block 1110 can include the operations of sub-blocks 1111-1112. In sub-block 1111, the node can determine a first pair of tapering vectors (tk-1, tl-1) based on minimizing a first function f(δ1, ϵ), where ϵ1 is associated with first modulation and coding schemes (MCSk-1, MCSl-1) for the beams of orientations (k, l). In sub-block 1112, the node can determine a second pair of tapering vectors (tk-2, tl-2) based on minimizing a second function f(δ2, ϵ), where δ2 is associated with second modulation and coding schemes (MCSk-2, MCSl-2) for the beams of orientations (k, l). In other words, the node can determine two pairs of tapering vectors for a single pair of orientations (k, l), with each pair of tapering vectors associated with a different pair of MCS for the beams.

In such embodiments, forming the codebook (T) in block 1120 can include the operations of sub-block 1121, where the node can store the first and second pairs of tapering vectors in T in association with orientations (k, l). Additionally, in some variants, selecting an entry (ti, tj) in codebook T in sub-block 1131 can include selecting, as (ti, tj), either the first pair of tapering vectors (ti-1, tj-1) or the second pair of tapering vectors (ti-2, tj-2) based on modulation and coding schemes (MCSi, MCSj) used for the data carried by the beams of orientations (i, j).

These operations can be further extended as needed to additional pairs of MCS that are available for transmitting data via the beams of orientations (k, l).

In other embodiments, the threshold δ is −25 dB relative to the power of the beams of orientations (l, k). Other thresholds relative to beam power can also be used according to requirements of particular applications.

As mentioned above, the exemplary method shown in FIG. 11 can be implemented by a node (e.g., UE, base station, etc.) of a wireless network (e.g., E-UTRAN, NG-RAN, etc.). For example, the node can include an antenna array comprising a plurality of elements and transmitting circuitry operably coupled to the antenna array. Examples of this hardware arrangement are shown in FIGS. 1A-1D. Additionally, the node can include processing circuitry operably coupled to the transmitting circuitry and the antenna array, whereby the node is configured to perform operations corresponding to any of those described above with reference to FIG. 11. For example, the processing circuitry can perform the operations of blocks 1110-1120 and can perform the operations of block 1130 in cooperation with the transmitting circuitry and the antenna array.

However, the node hardware arrangement described above is merely exemplary. More specifically, the node can have any hardware arrangement that can be configured and/or arranged to perform operations corresponding to any of those described above with reference to FIG. 11.

Additionally, the exemplary method shown in FIG. 11 can be realized as a non-transitory, computer-readable medium storing computer-executable instructions. When executed by processing circuitry of a node configured for beamforming using an antenna array, the instructions configure the node to perform operations corresponding to any of those described above with reference to FIG. 11.

Additionally, the exemplary method shown in FIG. 11 can be realized as a computer program product comprising computer-executable instructions. When executed by processing circuitry of a node configured for beamforming using an antenna array, the instructions configure the node to perform operations corresponding to any of those described above with reference to FIG. 11.

Figures 12, 13, 14, 15:
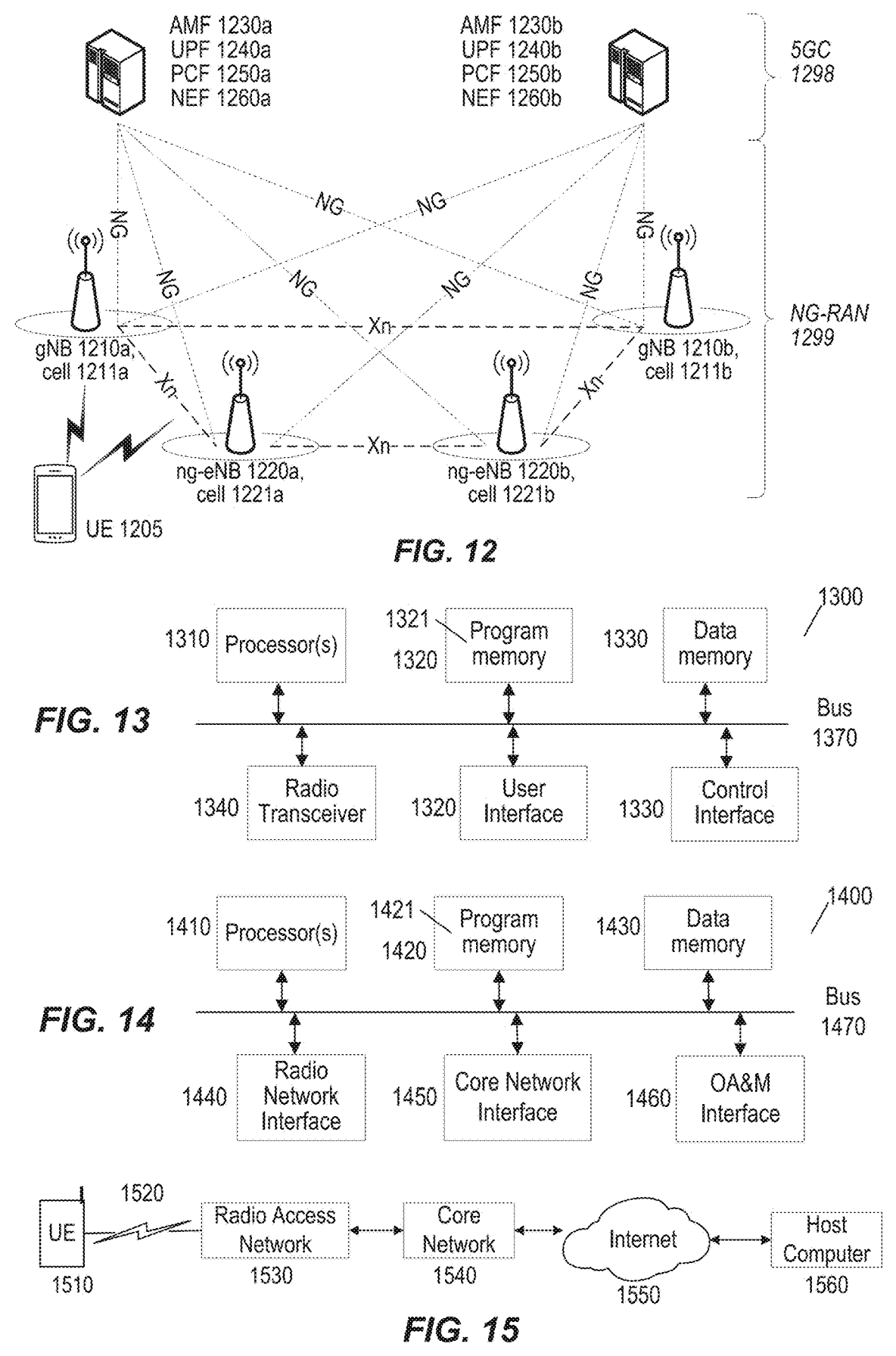

FIG. 12 shows a high-level view of an exemplary 5G network architecture in which various embodiments of the present disclosure can be used. The exemplary architecture shown in FIG. 12 includes a Next Generation Radio Access Network (NG-RAN) 1299 and a 5G Core (5GC) 1298. As shown in the figure, NG-RAN 1299 can include gNBs 1210 (e.g., 1210*a,b*) and ng-eNBs 1220 (e.g., 1220*a,b*) that are interconnected with each other via respective Xn interfaces. The gNBs and ng-eNBs are also connected via the NG interfaces to 5GC 1298, more specifically to the AMF (Access and Mobility Management Function) 1230 (e.g., AMFs 1230*a,b*) via respective NG-C interfaces and to the UPF (User Plane Function) 1240 (e.g., UPFs 1240*a,b*) via respective NG-U interfaces. Moreover, the AMFs 1230*a,b* can communicate with one or more policy control functions (PCFs, e.g., PCFs 1250*a,b*) and network exposure functions (NEFs, e.g., NEFs 1260*a,b*).

Each of the gNBs 1210 can support the NR radio interface including frequency division duplexing (FDD), time division duplexing (TDD), or a combination thereof. In contrast, each of ng-eNBs 1220 can support the LTE radio interface but, unlike conventional LTE eNodeBs (eNBs), connect to the 5GC via the NG interface. Each of the gNBs and ng-eNBs can serve a geographic coverage area including one more cells, including cells 1211*a-b* and 1221*a-b* shown as exemplary in FIG. 12. The gNBs and ng-eNBs can also use various directional beams to provide coverage in the respective cells. For example, the gNBs and ng-eNBs can be embodiments of a node coupled to an antenna array and configured to perform operations corresponding to the method shown in FIG. 11. Depending on the particular cell in which it is located, a UE 1205 can communicate with the gNB or ng-eNB serving that cell via the NR or LTE radio interface, respectively. For example, UE 1205 can be an embodiment of a node that includes an antenna array and is configured to perform operations corresponding to the method shown in FIG. 11.

The gNBs shown in FIG. 12 can include a central (or centralized) unit (CU or gNB-CU) and one or more distributed (or decentralized) units (DU or gNB-DU), which can be viewed as logical nodes. CUs host higher-layer protocols and perform various gNB functions such controlling the operation of DUs, which host lower-layer protocols and can include various subsets of the gNB functions. As such, each of the CUs and DUs can include various circuitry needed to perform their respective functions, including processing circuitry, communication interface circuitry (e.g., for communication via Xn, NG, radio, etc. interfaces), and power supply circuitry. Moreover, the terms "central unit" and "centralized unit" can be used interchangeably, as can the terms "distributed unit" and "decentralized unit."

A CU connects to its associated DUs over respective F1 logical interfaces. A CU and associated DUs are only visible to other gNBs and the 5GC as a gNB, e.g., the F1 interface is not visible beyond a CU. A CU can host higher-layer protocols such as F1 application part protocol (F1-AP), Stream Control Transmission Protocol (SCTP), GPRS Tunneling Protocol (GTP), Packet Data Convergence Protocol (PDCP), User Datagram Protocol (UDP), Internet Protocol (IP), and Radio Resource Control (RRC) protocol. In contrast, a DU can host lower-layer protocols such as Radio Link Control (RLC), Medium Access Control (MAC), and physical-layer (PHY) protocols.

Other variants of protocol distributions between CU and DU can exist, however, such as hosting the RRC, PDCP and part of the RLC protocol in the CU (e.g., Automatic Retransmission Request (ARQ) function), while hosting the remaining parts of the RLC protocol in the DU, together with MAC and PHY. In some embodiments, the CU can host RRC and PDCP, where PDCP is assumed to handle both UP traffic and CP traffic. Nevertheless, other exemplary embodiments may utilize other protocol splits that by hosting certain protocols in the CU and certain others in the DU.

FIG. 13 shows a block diagram of an exemplary wireless device or user equipment (UE) 1300 (hereinafter referred to as "UE 1300") according to various embodiments of the present disclosure, including those described above with reference to other figures. For example, UE 1300 can be configured by execution of instructions, stored on a computer-readable medium, to perform operations corresponding to one or more of the exemplary methods described herein.

UE 1300 can include a processor 1310 (also referred to as "processing circuitry") that can be operably connected to a program memory 1320 and/or a data memory 1330 via a bus 1370 that can comprise parallel address and data buses, serial ports, or other methods and/or structures known to those of ordinary skill in the art. Program memory 1320 can store software code, programs, and/or instructions (collectively shown as computer program product 1321 in FIG. 13) that, when executed by processor 1310, can configure and/or facilitate UE 1300 to perform various operations, including operations corresponding to various exemplary methods described herein. As part of or in addition to such operations, execution of such instructions can configure and/or facilitate UE 1300 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.11 WiFi, HDMI, USB, Firewire, etc., or any other current or future protocols that can be utilized in conjunction with radio transceiver 1340, user interface 1350, and/or control interface 1360.

As another example, processor 1310 can execute program code stored in program memory 1320 that corresponds to MAC, RLC, PDCP. SDAP, RRC, and NAS layer protocols standardized by 3GPP (e.g., for NR and/or LTE). As a further example, processor 1310 can execute program code stored in program memory 1320 that, together with radio transceiver 1340, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 1310 can execute program code stored in program memory 1320 that, together with radio transceiver 1340, implements device-to-device (D2D) communications with other compatible devices and/or UEs.

Program memory 1320 can also include software code executed by processor 1310 to control the functions of UE 1300, including configuring and controlling various components such as radio transceiver 1340, user interface 1350, and/or control interface 1360. Program memory 1320 can also comprise one or more application programs and/or modules comprising computer-executable instructions embodying any of the exemplary methods described herein. Such software code can be specified or written using any known or future developed programming language, such as e.g., Java, C++, C. Objective C. HTML, XHTML, machine code, and Assembler, as long as the desired functionality, e.g., as defined by the implemented method steps, is preserved. In addition, or as an alternative, program memory 1320 can comprise an external storage arrangement (not shown) remote from UE 1300, from which the instructions can be downloaded into program memory 1320 located within or removably coupled to UE 1300, so as to enable execution of such instructions.

Data memory 1330 can include memory area for processor 1310 to store variables used in protocols, configuration, control, and other functions of UE 1300, including operations corresponding to, or comprising, any of the exemplary methods described herein. Moreover, program memory 1320 and/or data memory 1330 can include non-volatile memory (e.g., flash memory), volatile memory (e.g., static or dynamic RAM), or a combination thereof. Furthermore, data memory 1330 can comprise a memory slot by which removable memory cards in one or more formats (e.g., SD Card, Memory Stick, Compact Flash, etc.) can be inserted and removed.

Persons of ordinary skill will recognize that processor 1310 can include multiple individual processors (including, e.g., multi-core processors), each of which implements a portion of the functionality described above. In such cases, multiple individual processors can be commonly connected to program memory 1320 and data memory 1330 or individually connected to multiple individual program memories and or data memories. More generally, persons of ordinary skill in the art will recognize that various protocols and other functions of UE 1300 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

For example, radio transceiver 1340 can include transmitters, receivers, signal processors, ASICs, antennas, beamforming units, and other circuitry that enable UE 1300 to communicate with other equipment supporting like wireless communication standards and/or protocols, such as a compatible network node. In some embodiments, radio transceiver 1340 includes circuitry that enables UE 1300 to communicate according to various protocols and/or methods standardized by 3GPP and/or other standards bodies. For example, such functionality can operate cooperatively with processor 1310 to implement a PHY layer based on OFDM, OFDMA, and/or SC-FDMA technologies.

In some embodiments, radio transceiver 1340 includes circuitry, firmware, etc. necessary for the UE 1300 to communicate with various NR, NR-U, LTE, LTE-A, LTE-LAA, UMTS, and/or GSM/EDGE networks, also according to 3GPP standards. In some embodiments, radio transceiver 1340 includes circuitry, firmware, etc. necessary for the UE 1300 to communicate using radio technologies that operate in unlicensed frequency bands, such as IEEE 802.11 WiFi that operates using frequencies in the regions of 2.4, 5.6, and/or 60 GHz. In some embodiments, radio transceiver 1340 can include circuitry supporting D2D communications between UE 1300 and other compatible devices.

The functionality particular to each of these embodiments can be coupled with and/or controlled by other circuitry in the UE 1300, such as the processor 1310 executing program code stored in program memory 1320 in conjunction with, and/or supported by, data memory 1330.

User interface 1350 can take various forms depending on the particular embodiment of UE 1300, or can be absent from UE 1300 entirely. In some embodiments, user interface 1350 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1300 can comprise a tablet computing device including a larger touchscreen display. In such embodiments, one or more of the mechanical features of the user interface 1350 can be replaced by comparable or functionally equivalent virtual user interface features (e.g., virtual keypad, virtual buttons, etc.) implemented using the touchscreen display, as familiar to persons of ordinary skill in the art. In other embodiments, the UE 1300 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the UE 1300 having a touch screen display are capable of receiving user inputs, such as inputs related to exemplary methods described herein or otherwise known to persons of ordinary skill.

In some embodiments, UE 1300 can include an orientation sensor, which can be used in various ways by features and functions of UE 1300. For example, the UE 1300 can use outputs of the orientation sensor to determine when a user has changed the physical orientation of the UE 1300's touch screen display. An indication signal from the orientation sensor can be available to any application program executing on the UE 1300, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1360 of the UE 1300 can take various forms depending on the particular exemplary embodiment of UE 1300 and of the particular interface requirements of other devices that the UE 1300 is intended to communicate with and/or control. For example, the control interface 1360 can comprise an RS-232 interface, a USB interface, an HDMI interface, a Bluetooth interface, an IEEE ("Firewire") interface, an I2C interface, a PCMCIA interface, or the like. In some exemplary embodiments of the present disclosure, control interface 1360 can comprise an IEEE 802.3 Ethernet interface such as described above. In some exemplary embodiments of the present disclosure, the control interface 1360 can comprise analog interface circuitry including, for example, one or more digital-to-analog converters (DACs) and/or analog-to-digital converters (ADCs).

Persons of ordinary skill in the art can recognize the above list of features, interfaces, and radio-frequency communication standards is merely exemplary, and not limiting to the scope of the present disclosure. In other words, the UE 1300 can comprise more functionality than is shown in FIG. 13 including, for example, a video and/or still-image camera, microphone, media player and/or recorder, etc. Moreover, radio transceiver 1340 can include circuitry necessary to communicate using additional radio-frequency communication standards including Bluetooth, GPS, and/or others. Moreover, the processor 1310 can execute software code stored in the program memory 1320 to control such additional functionality. For example, directional velocity and/or position estimates output from a GPS receiver can be available to any application program executing on the UE 1300, including any program code corresponding to and/or embodying any exemplary embodiments (e.g., of methods) described herein.

FIG. 14 shows a block diagram of an exemplary network node 1400 according to various embodiments of the present disclosure, including those described above with reference to other figures. For example, exemplary network node 1400 can be configured by execution of instructions, stored on a computer-readable medium, to perform operations corresponding to one or more of the exemplary methods described herein. In some exemplary embodiments, network node 1400 can comprise a base station, eNB, gNB, or one or more components thereof. For example, network node 1400 can be configured as a central unit (CU) and one or more distributed units (DUs) according to NR gNB architectures specified by 3GPP. More generally, the functionally of network node 1400 can be distributed across various physical devices and/or functional units, modules, etc.

Network node 1400 can include processor 1410 (also referred to as "processing circuitry") that is operably connected to program memory 1420 and data memory 1430 via bus 1470, which can include parallel address and data buses, serial ports, or other methods and/or structures known to those of ordinary skill in the art.

Program memory 1420 can store software code, programs, and/or instructions (collectively shown as computer program product 1421 in FIG. 14) that, when executed by processor 1410, can configure and/or facilitate network node 1400 to perform various operations, including operations corresponding to various exemplary methods described herein. As part of and/or in addition to such operations, program memory 1420 can also include software code executed by processor 1410 that can configure and/or facilitate network node 1400 to communicate with one or more other UEs or network nodes using other protocols or protocol layers, such as one or more of the PHY, MAC, RLC, PDCP, SDAP, RRC, and NAS layer protocols standardized by 3GPP for LTE, LTE-A, and/or NR, or any other higher-layer protocols utilized in conjunction with radio network interface 1440 and/or core network interface 1450. By way of example, core network interface 1450 can comprise the S1 or NG interface and radio network interface 1440 can comprise the Uu interface, as standardized by 3GPP. Program memory 1420 can also comprise software code executed by processor 1410 to control the functions of network node 1400, including configuring and controlling various components such as radio network interface 1440 and core network interface 1450.

Data memory 1430 can comprise memory area for processor 1410 to store variables used in protocols, configuration, control, and other functions of network node 1400. As such, program memory 1420 and data memory 1430 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1410 can include multiple individual processors (not shown), each of which implements a portion of the functionality described above. In such case, multiple individual processors may be commonly connected to program memory 1420 and data memory 1430 or individually connected to multiple individual program memories and/or data memories. More generally, persons of ordinary skill will recognize that various protocols and other functions of network node 1400 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1440 can comprise transmitters, receivers, signal processors, ASICs, antennas, beamforming units, and other circuitry that enables network node 1400 to communicate with other equipment such as, in some embodiments, a plurality of compatible user equipment (UE). In some embodiments, interface 1440 can also enable network node 1400 to communicate with compatible satellites of a satellite communication network. In some exemplary embodiments, radio network interface 1440 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1440. According to further exemplary embodiments of the present disclosure, the radio network interface 1440 can comprise a PHY layer based on OFDM, OFDMA, and/or SC-FDMA technologies. In some embodiments, the functionality of such a PHY layer can be provided cooperatively by radio network interface 1440 and processor 1410 (including program code in memory 1420).

Core network interface 1450 can comprise transmitters, receivers, and other circuitry that enables network node 1400 to communicate with other equipment in a core network such as, in some embodiments, circuit-switched (CS) and/or packet-switched Core (PS) networks. In some embodiments, core network interface 1450 can comprise the S1 interface standardized by 3GPP. In some embodiments, core network interface 1450 can comprise the NG interface standardized by 3GPP. In some exemplary embodiments, core network interface 1450 can comprise one or more interfaces to one or more AMFs, SMFs, SGWs, MMEs, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1450 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 1400 can include hardware and/or software that configures and/or facilitates network node 1400 to communicate with other network nodes in a RAN, such as with other eNBs, gNBs, ng-eNBs, en-gNBs, IAB nodes, etc. Such hardware and/or software can be part of radio network interface 1440 and/or core network interface 1450, or it can be a separate functional unit (not shown). For example, such hardware and/or software can configure and/or facilitate network node 1400 to communicate with other RAN nodes via the X2 or Xn interfaces, as standardized by 3GPP.

OA&M interface 1460 can comprise transmitters, receivers, and other circuitry that enables network node 1400 to communicate with external networks, computers, databases, and the like for purposes of operations, administration, and maintenance of network node 1400 or other network equipment operably connected thereto. Lower layers of OA&M interface 1460 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1440, core network interface 1450, and OA&M interface 1460 may be multiplexed together on a single physical interface, such as the examples listed above.

FIG. 15 is a block diagram of an exemplary communication network configured to provide over-the-top (OTT) data services between a host computer and a user equipment (UE), according to one or more exemplary embodiments of the present disclosure. UE 1510 can communicate with radio access network (RAN) 1530 over radio interface 1520, which can be based on protocols described above including, e.g., LTE, LTE-A, and 5G/NR. For example, UE 1510 can be configured and/or arranged as shown in other figures discussed above.

RAN 1530 can include one or more network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1530 can cooperatively operate using licensed and unlicensed spectrum. In some embodiments, RAN 1530 can include, or be capable of communication with, one or more satellites comprising a satellite access network.

RAN 1530 can further communicate with core network 1540 according to various protocols and interfaces described above. For example, one or more apparatus (e.g., base stations, eNBs, gNBs, ng-eNBs, etc.) comprising RAN 1530 can communicate to core network 1540 via core network interface 1550 described above. In some exemplary embodiments, RAN 1530 and core network 1540 can be configured and/or arranged as shown in other figures discussed above. For example, eNBs comprising an evolved UTRAN (E-UTRAN) 1530 can communicate with an evolved packet core (EPC) network 1540 via an S1 interface. As another example, gNBs and ng-eNBs comprising an NG-RAN 1530 can communicate with a 5GC network 1530 via an NG interface.

Core network 1540 can further communicate with an external packet data network, illustrated in FIG. 15 as Internet 1550, according to various protocols and interfaces known to persons of ordinary skill in the art. Many other devices and/or networks can also connect to and communicate via Internet 1550, such as exemplary host computer 1560. In some exemplary embodiments, host computer 1560 can communicate with UE 1510 using Internet 1550, core network 1540, and RAN 1530 as intermediaries. Host computer 1560 can be a server (e.g., an application server) under ownership and/or control of a service provider. Host computer 1560 can be operated by the OTT service provider or by another entity on the service provider's behalf.

For example, host computer 1560 can provide an over-the-top (OTT) packet data service to UE 1510 using facilities of core network 1540 and RAN 1530, which can be unaware of the routing of an outgoing/incoming communication to/from host computer 1560. Similarly, host computer 1560 can be unaware of routing of a transmission from the host computer to the UE, e.g., the routing of the transmission through RAN 1530. Various OTT services can be provided using the exemplary configuration shown in FIG. 15 including, e.g., streaming (unidirectional) audio and/or video from host computer to UE, interactive (bidirectional) audio and/or video between host computer and UE, interactive messaging or social communication, interactive virtual or augmented reality, cloud gaming, etc.

The exemplary network shown in FIG. 15 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

Embodiments described herein provide tapering techniques for beam-based transmission that are more efficient than conventional techniques, which generate overly-restrictive beams having low sidelobes in many different orientations rather than only in orientations of co-scheduled layers. Additionally, embodiments waste less transmit power due to sidelobe suppression, such that more transmit power is available for the main lobes of concurrent beams. Embodiments also provide flexible tradeoffs between sidelobe suppression and main lobe power based on a configurable interference threshold. Furthermore, beamforming vector codebooks can be kept relatively small since they are only required to include beam weights for individual orientations/users (e.g., SU-MIMO).

When used in NR gNBs (e.g., gNBs comprising RAN 1530), embodiments can improve performance of multi-user MIMO transmission, thereby increasing coverage and/or downlink capacity in a cell. When used in NR UEs (e.g., UE 1510), embodiments can improve uplink coverage, which is often limited due to output power restrictions. In this manner, embodiments can increase the use of OTT data services by providing better coverage and/or capacity for such data services. Consequently, this increases the benefits and/or value of OTT data services to end users and OTT service providers.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The invention claimed is:

1. A method of beamforming using an antenna array, the method performed by a node of a wireless network and comprising:

for each pair of beamforming vectors (bk, bl) of a codebook (B) comprising a plurality of beamforming vectors (b1 . . . bN) corresponding to a respective plurality of orientations (1. . . . N), determining at least one corresponding pair of tapering vectors (tk, tl) based on minimizing at least one function $f(\delta, \epsilon)$, such that when tapered beamforming vectors (tk·bk, tl·bl) are applied to portions of the antenna array for transmitting concurrent beams of orientations ($1 \le k \le N$, $1 \le l \le N$, $k \ne l$):

radiated power in orientations (k, l) are at least $(1-\epsilon)$ *(Pk, Pl), where (Pk, Pl) are peak radiated powers in orientations (k, l) of respective beams formed by (bk, bl); and the beams of orientations (k, l) have sidelobes that are lower than $\delta$ in respective orientations (l, k); and transmitting data concurrently in orientations ($1 \le i \le N$, $1 \le j \le N$, $i \ne j$) based on weighting the portions of the antenna array by the tapered beamforming vectors (ti·bi, tj·bj) corresponding to the orientations (i, j).

2. The method of claim 1, wherein each corresponding pair of tapering vectors (tk, tl) is further determined such that radiated power in orientations (k, l) are no greater than (Pk, Pl).

3. The method of claim 1, wherein:

each beamforming vector (b1 . . . bN) and each tapering vector (tk, tl) comprises M values corresponding to respective M portions of the antenna array; and the data is transmitted via respective power amplifiers (PA-1 . . . PA-M) coupled to the M portions of the antenna array.

4. The method of claim 3, wherein all corresponding pairs of tapering vectors (tk, tl) are further determined according to one of the following constraints:

the respective magnitudes of the M values of each tapering vector are less than or equal to 1; or the respective magnitudes of the M values of each tapered beamforming vector are less than or equal to 1.

5. The method of claim 3, wherein each corresponding pair of tapering vectors (tk, tl) is further determined such that the respective sums of the following are less than or equal to one:

the squared magnitudes of the M values of tapered beamforming vector tk·bk, and the squared magnitudes of the M values of tapered beamforming vector tl·bl.

6. The method of claim 3, wherein all corresponding pairs of tapering vectors (tk, tl) are further determined based on one of the following criteria:

the M values of each tapering vector are constrained to be real values; or the M values of each tapering vector are allowed to be real values or complex values.

7. The method of claim 3, wherein the M portions of the antenna array are one of the following: M antenna elements; or M antenna sub-arrays, each sub-array including a plurality of antenna elements.

8. The method of claim 1, wherein the method further comprises forming a codebook (T) comprising a plurality of entries indicating respective pairs of tapering vectors (tk, tl) determined for orientations (k, l), $1 \le k \le N$, $1 \le l \le N$, $k \ne l$.

9. The method of claim 8, wherein transmitting data concurrently in orientations (i, j) comprises:

selecting an entry (ti, tj) in codebook (T) that corresponds to the orientations (i, j);

selecting entries (bi, bj) from codebook (B) that correspond to the orientations (i, j); and forming the tapered beamforming vectors (ti·bi, tj·bj) based on the selected entry from codebook (T) and the selected entries from codebook (B).

10. The method of claim 9, wherein:

determining at least one pair of tapering vectors (tk, tl) for the beams of orientations (k, l) comprises:

determining a first pair of tapering vectors (tk-1, tl-1) based on minimizing a first function $f(\delta 1, \epsilon)$, where $\epsilon$1 is associated with first modulation and coding schemes (MCSk-1, MCSl-1) for the beams of orientations (k, l); and determining a second pair of tapering vectors (tk-2, tl-2) based on minimizing a second function $f(\delta 2, \epsilon)$, where $\delta 2$ is associated with second modulation and coding schemes (MCSk-2, MCSl-2) for the beams of orientations (k, l); and forming the codebook (T) comprises storing the first and second pairs of tapering vectors in T in association with orientations (k, l).

11. The method of claim 1, wherein one or more of the following applies:

$\delta$ is −25 dB relative to the power of the beams of orientations (l, k);

$$(1-\epsilon) \ge 0.95; \text{ and}$$

$$f(\delta, \epsilon) = (\delta + \alpha \cdot \epsilon) \text{ and } \alpha \ge 0.$$

12. A node configured to operate in a wireless network, the node comprising:

an antenna array comprising a plurality of elements;

transmitting circuitry operably coupled to the antenna array; and processing circuitry operably coupled to the transmitting circuitry and the antenna array, the processing circuitry being configured to cause the node to:

for each pair of beamforming vectors (bk, bl) of a codebook (B) comprising a plurality of beamforming vectors (b1 . . . bN) corresponding to a respective plurality of orientations (1 . . . N), determine at least one corresponding pair of tapering vectors (tk, tl) based on minimizing at least one function f(δ, ϵ), such that when tapered beamforming vectors (tk·bk, tl·bl) are applied to portions of the antenna array for transmitting concurrent beams of orientations (1≤k≤N, 1≤l≤N, k≠l):

radiated power in orientations (k, l) are at least (1−ϵ)*(Pk, Pl), where (Pk, Pl) are peak radiated powers in orientations (k, l) of respective beams formed by (bk, bl); and the beams of orientations (k, l) have sidelobes that are lower than δ in respective orientations (l, k); and transmit data concurrently in orientations (1≤i≥N, 1≤j≤N, i≠j) based on weighting the portions of the antenna array by the tapered beamforming vectors (ti·bi, tj·bj) corresponding to the orientations (i, j).

13. The node of claim 12, wherein each corresponding pair of tapering vectors (tk, tl) is further determined such that radiated power in orientations (k, l) are no greater than (Pk, Pl).

14. The node of claim 12, wherein:

each beamforming vector (b1 . . . bN) and each tapering vector (tk, tl) comprises M values corresponding to respective M portions of the antenna array; and the data is transmitted via respective power amplifiers (PA-1 . . . PA-M) coupled to the M portions of the antenna array.

15. The node of claim 14, wherein all corresponding pairs of tapering vectors (tk, tl) are further determined according to one of the following constraints:

the respective magnitudes of the M values of each tapering vector are less than or equal to 1; or the respective magnitudes of the M values of each tapered beamforming vector are less than or equal to 1.

16. The node of claim 14, wherein each corresponding pair of tapering vectors (tk, tl) is further determined such that the respective sums of the following are less than or equal to one:

the squared magnitudes of the M values of tapered beamforming vector tk·bk, and the squared magnitudes of the M values of tapered beamforming vector tl·bl.

17. The node of claim 14, wherein all corresponding pairs of tapering vectors (tk, tl) are further determined based on one of the following criteria:

the M values of each tapering vector are constrained to be real values; or the M values of each tapering vector are allowed to be real values or complex values.

18. The node of claim 14, wherein the M portions of the antenna array are one of the following: M antenna elements; or M antenna sub-arrays, with each sub-array including a plurality of antenna elements.

19. The node of claim 12, wherein the processing circuitry is further configured to cause the node to form a codebook (T) comprising a plurality of entries indicating respective pairs of tapering vectors (tk, tl) determined for orientations (k, l), 1≤k≤N, 1≤l≤N, k≠l.

20. The node of claim 19, wherein the processing circuitry is configured to cause the node to transmit data concurrently in orientations (i, j) based on:

selecting an entry (ti, tj) in codebook (T) that corresponds to the orientations (i, j);

selecting entries (bi, bj) from codebook (B) that correspond to the orientations (i, j); and forming the tapered beamforming vectors (ti·bi, tj·bj) based on the selected entry from codebook (T) and the selected entries from codebook (B).

21. The node of claim 20, wherein the processing circuitry is configured to cause the node to:

determine at least one pair of tapering vectors (tk, tl) for the beams of orientations (k, l) based on:

determining a first pair of tapering vectors (tk-1, tl-1) based on minimizing a first function f(δ1, ϵ), where ϵ1 is associated with first modulation and coding schemes (MCSk-1, MCSl-1) for the beams of orientations (k, l); and determining a second pair of tapering vectors (tk-2, tl-2) based on minimizing a second function f(δ2, ϵ), where δ2 is associated with second modulation and coding schemes (MCSk-2, MCSl-2) for the beams of orientations (k, l); and form the codebook (T) based on storing the first and second pairs of tapering vectors in T in association with orientations (k, l).

22. The node of claim 12, wherein one or more of the following applies:

δ is −25 dB relative to the power of the beams of orientations (l, k);

$$(1-\epsilon) \geq 0.95; \text{ and}$$

$$f(\delta, \epsilon) = (\delta + \alpha \cdot \epsilon) \text{ and } \alpha \geq 0.$$

23. The node of claim 12, wherein the node is one of the following: a network node, or a user equipment.

* * * * *